(12) United States Patent
Chun et al.

(10) Patent No.: US 11,924,519 B2
(45) Date of Patent: Mar. 5, 2024

(54) DISPLAY DEVICE AND CONTROL METHOD THEREFOR

(71) Applicant: LG ELECTRONICS INC., Seoul (KR)

(72) Inventors: Youngho Chun, Seoul (KR); Hyungil Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 17/597,237

(22) PCT Filed: Jul. 2, 2019

(86) PCT No.: PCT/KR2019/008039
§ 371 (c)(1),
(2) Date: Dec. 29, 2021

(87) PCT Pub. No.: WO2021/002496
PCT Pub. Date: Jan. 7, 2021

(65) Prior Publication Data
US 2022/0321973 A1    Oct. 6, 2022

(51) Int. Cl.
*H04N 21/40*    (2011.01)
*G09G 5/10*    (2006.01)
(Continued)

(52) U.S. Cl.
CPC ........... *H04N 21/4854* (2013.01); *G09G 5/10* (2013.01); *G09G 2320/0626* (2013.01)

(58) Field of Classification Search
CPC .... G09G 5/10; G09G 2320/0626; G09G 5/12; G09G 5/227; G09G 2320/02;
(Continued)

(56) References Cited

U.S. PATENT DOCUMENTS

2008/0205514 A1* 8/2008 Nishio ................. H04N 11/042
375/E7.076
2011/0298818 A1* 12/2011 Mori ..................... G09G 3/3208
345/589

(Continued)

FOREIGN PATENT DOCUMENTS

JP    2010139783    6/2010
KR    100303485    11/2001
(Continued)

OTHER PUBLICATIONS

PCT International Application No. PCT/KR2019/008039, International Search Report dated Apr. 1, 2020, 9 pages.

*Primary Examiner* — Wesner Sajous
(74) *Attorney, Agent, or Firm* — LEE, HONG, DEGERMAN, KANG & WAIMEY

(57) ABSTRACT

The present invention relates to a display device and a control method therefor, and involves the concept of controlling a display to reduce luminance from a default luminance to a first luminance for a first reduction time when brightness of a fixed area is maintained for a first predetermined time or more, and controlling the display to increase the luminance from the first luminance to the default luminance, when a set-top box receives, from an external device within a second predetermined time, a first signal for changing a screen from a first screen to a second screen.

19 Claims, 24 Drawing Sheets

(51) Int. Cl.
*H04N 5/445* (2011.01)
*H04N 21/485* (2011.01)

(58) Field of Classification Search
CPC ... G09G 2320/0209; G09G 2320/0233; G09G 2320/0271; G09G 2320/04; G09G 2320/06; G09G 2320/043; G09G 2320/045; G09G 2320/046; G09G 2320/062; G09G 2320/0633; G09G 2320/064; G09G 2320/0693; G09G 2354/00; G09G 2330/022; G09G 2330/02; G09G 2340/0407; G09G 2340/0442; H04N 21/4854; H04N 21/40; H04N 21/48884; H04N 11/06; H04N 11/14; H04N 9/67; H04N 9/77; H04N 5/445; H04N 5/45; H04N 5/50; H04N 5/57–5/58; H04N 5/21; H04N 5/268; H04N 5/213; H04N 5/211; H04N 5/05; H04N 21/485; H04N 23/74

USPC .................................................... 345/489
See application file for complete search history.

(56) References Cited

U.S. PATENT DOCUMENTS

| 2014/0133579 A1* | 5/2014 | Nishio | H04N 11/042 375/240.25 |
| 2016/0191158 A1* | 6/2016 | Aoyama | H04B 10/54 398/172 |
| 2019/0238631 A1* | 8/2019 | Aoyama | G01R 27/04 |

FOREIGN PATENT DOCUMENTS

| KR | 1020050036655 | 4/2005 | |
| KR | 1020080042997 | 5/2008 | |
| KR | 100303485 B1 * | 6/2010 | .......... G09G 3/3208 |
| KR | 1020150049895 | 5/2015 | |

* cited by examiner

FIG. 17
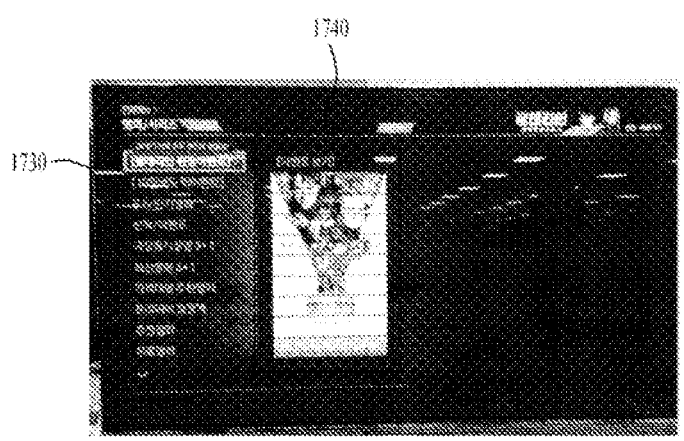

FIG. 18
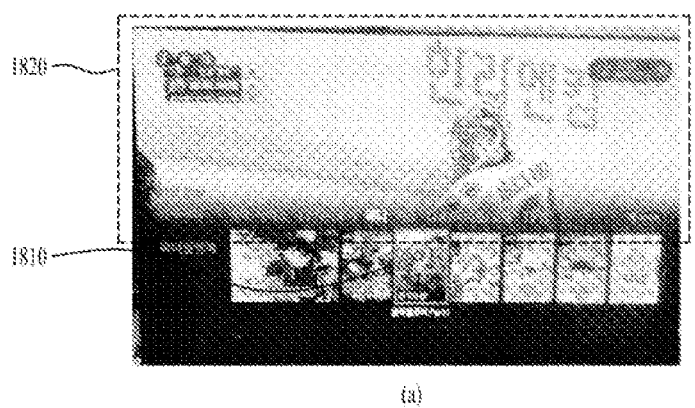
(a)
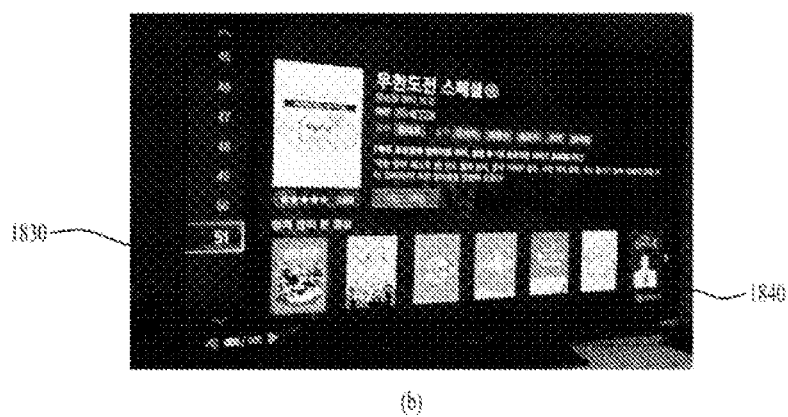
(b)

FIG. 19
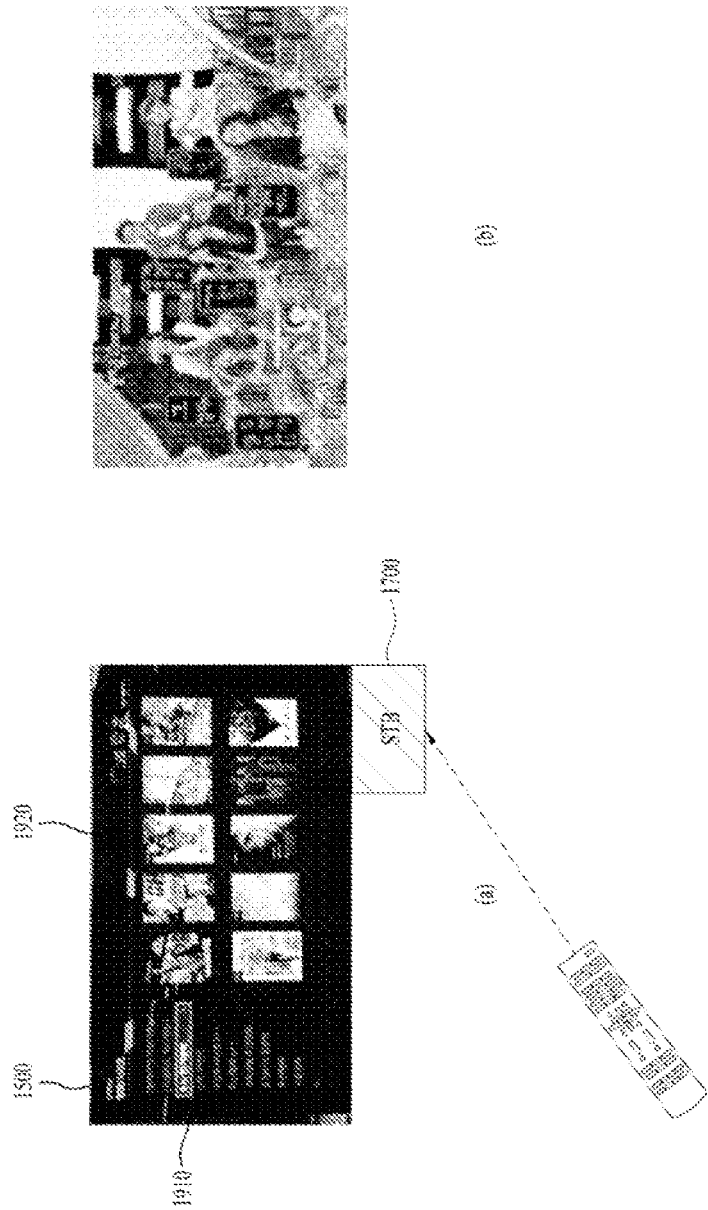

DISPLAY DEVICE AND CONTROL METHOD THEREFOR

CROSS-REFERENCE TO RELATED APPLICATIONS

This application is the National Stage filing under 35 U.S.C. 371 of International Application No. PCT/KR2019/008039, filed on Jul. 2, 2019, the contents of which are all incorporated by reference herein in its entirety.

TECHNICAL FIELD

The present disclosure relates to a display device and control method thereof, and more particularly, to a display device and control method thereof, capable of preventing screen degradation in a manner of sensing a region, from which an afterimage may be generated, from a settop box menu screen on a TV screen and switching the menu screen of the settop box to a live screen if receiving a specific signal from an integrated remote controller.

BACKGROUND ART

Recently, many users have been using display devices such as smart TVs. In the related art, a smart TV is connected to a settop box, and there is an afterimage problem on an OSD screen for setting a menu of the settop box.

Specifically, after entering a settop box menu key, there is no key timeout function and a video is inputted to an HDMI input. Since a screen saver is unable to operate due to inability of OSD division, as a long time goes by, an afterimage due to screen degradation occurs in a prescribed fixed region on an OSD screen, thereby causing inconvenience to a user.

DETAILED DESCRIPTION OF DISCLOSURE

Technical Tasks

As a fixed region of a settop box menu keeps being display, when it is highly possible that an afterimage is generated, a technical task of one embodiment of the present disclosure is to provide a display device and control method thereof, by which a screen is switched from a settop box menu screen to a live screen if a settop box receives a specific signal from a remote controller.

As a fixed region of a settop box menu keeps being display, when it is highly possible that an afterimage is generated, a technical task of another embodiment of the present disclosure is to provide a display device and control method thereof, by which a screen is switched from a settop box menu screen to a live screen by automatically transmitting a specific signal to a settop box.

As a fixed region of a settop box menu keeps being display, when it is highly possible that an afterimage is generated, a technical task of further embodiment of the present disclosure is to provide a display device and control method thereof, by which a display brightness is changed automatically.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Technical Solutions

In one technical aspect of the present disclosure, provided is a display device connected to a settop box, the display device including a communication unit 1520 performing communication with an external device and the settop box 1700, a display 1540 displaying a content included in a broadcast signal received from the settop box on a screen, a sensor unit 1550 sensing a brightness of the display, and a controller 1530 controlling at least one of the communication unit, the display, or the sensor unit, the controller 1530 configured to control the display unit to display the content, control the display to decrease the brightness to a first brightness value from a default brightness value for a first brightness decrease time if a brightness of a fixed region meaning a region sensed by the sensor unit and having the brightness maintained over a prescribed brightness in a whole display region is maintained over a first prescribed time, control the display to increase the brightness from the first brightness value to the default brightness value if the settop box receives a first signal of changing the screen from a first screen into a second screen from the external device within a second prescribed time, and control the display to decrease the brightness from the first brightness value to a second brightness value for a second brightness decrease time if the brightness of the fixed region sensed by the sensor unit is maintained over a second prescribed time while the settop box does not receive the first signal from the external device.

In another technical aspect of the present disclosure, provided is a method of controlling a display device connected to a settop box, the method including performing communication with an external device and the settop box [S1610], displaying a content included in a broadcast signal received from the settop box on a screen by a display [S1620], controlling the display to decrease a brightness to a first brightness value from a default brightness value for a first decrease time if a brightness of a fixed region meaning a region sensed by a sensor unit and having the brightness maintained over a prescribed brightness in a whole display region is maintained over a first prescribed time [S1630], controlling the display to increase the brightness from the first brightness value to the default brightness value if the settop box receives a first signal of changing a screen from a first screen into a second screen from the external device within a second prescribed time [S1640], and controlling the display to decrease the brightness from the first brightness to a second brightness for a second decrease time if the brightness of the fixed region sensed by the sensor unit is maintained over a second prescribed time while the settop box does not receive the first signal from the external device [S1650].

Advantageous Effects

According to one embodiment of the present disclosure, as a fixed region of a settop box menu keeps being display, when it is highly possible that an afterimage is generated, if a settop box receives a specific signal from a remote controller, a screen is switched from a settop box menu screen to a live screen so as to prevent a problem of afterimage generation from the screen, thereby improving user convenience.

According to another embodiment of the present disclosure, as a fixed region of a settop box menu keeps being display, when it is highly possible that an afterimage is generated, a screen is switched from a settop box menu screen to a live screen by automatically transmitting a specific signal to a settop box so as to prevent a problem of afterimage generation from the screen, thereby improving user convenience.

According to further embodiment of the present disclosure, as a fixed region of a settop box menu keeps being display, when it is highly possible that an afterimage is generated, a display brightness is changed automatically to prevent a problem of afterimage generation from a screen, thereby improving user convenience.

Effects obtainable from the present invention may be non-limited by the above-mentioned effect. And, other unmentioned effects can be clearly understood from the following description by those having ordinary skill in the technical field to which the present invention pertains.

DESCRIPTION OF DRAWINGS

FIG. 17 is a diagram showing that an afterimage is generated if a fixed region is neglected for a long time, according to one embodiment of the present disclosure.

FIG. 18 is a diagram showing that an afterimage is generated if a fixed region is neglected for a long time, according to one embodiment of the present disclosure.

FIG. 19 is a diagram showing that if a settop box receives a first signal from a remote controller, a screen is switched from a settop box menu screen to a live screen, according to one embodiment of the present disclosure.

BEST MODE FOR DISCLOSURE

Figure 1:
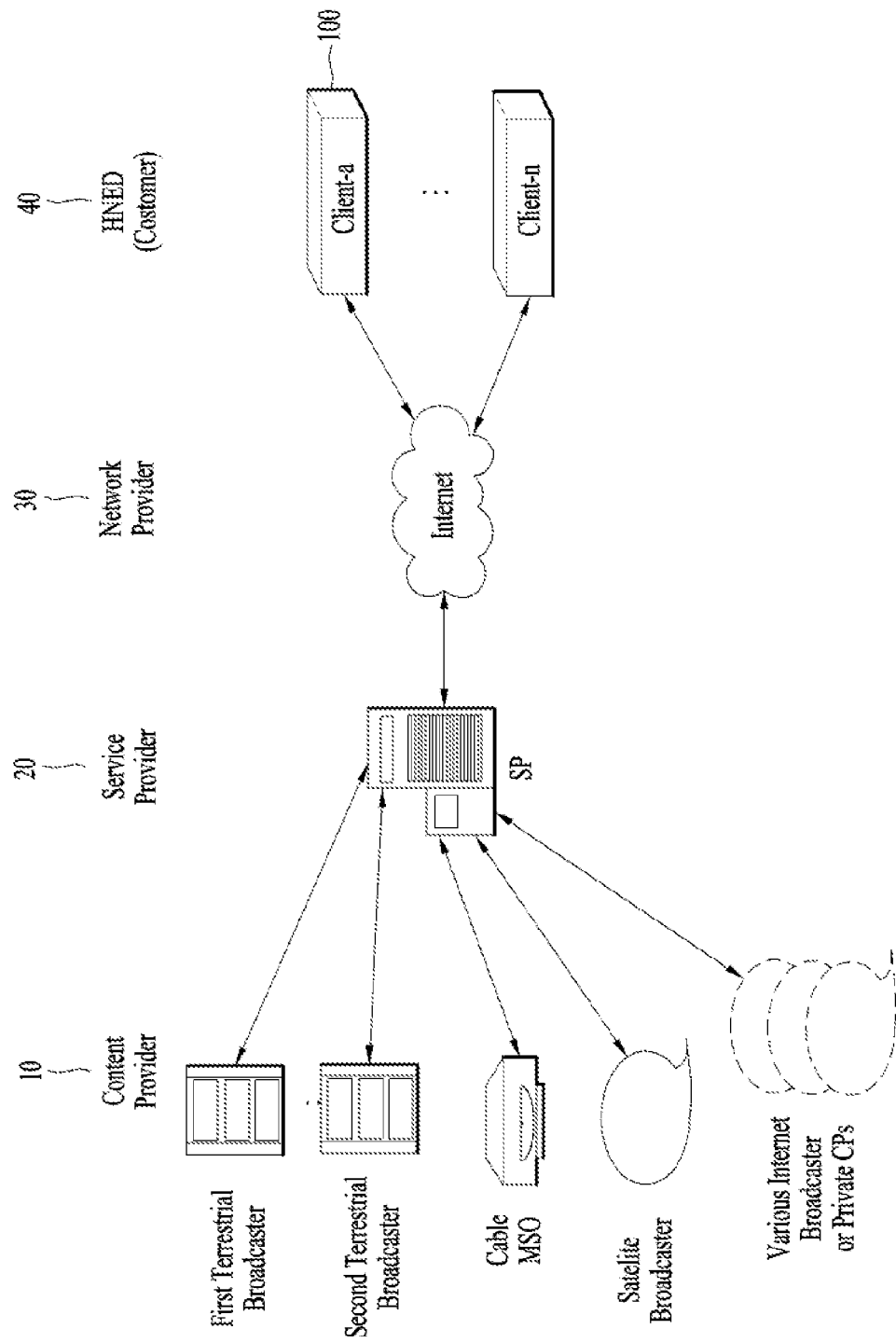
FIG. 1 is a schematic view illustrating a service system that includes a digital device according to one embodiment of the present disclosure.

Description will now be given in detail according to various embodiment(s) for a digital device and screen saver processing method therein disclosed herein, with reference to the accompanying drawings.

Suffixes such as "module", "unit" and the like in this disclosure may be used to refer to elements or components. Use of such a suffix herein is merely intended to facilitate description of the specification, and both suffixes may be interchangeably usable. The description with ordinal numbers such as 'first~', 'second~' and the like is provided to facilitate the description of the corresponding terminologies only, which is non-limited by such terminologies or ordinal numbers.

Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s).

Therefore, the digital device, for example, on the universal OS kernel, it is available to add and delete various applications and various functions can be performed.

In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Meanwhile, the descriptions disclosed in the present specification and/or drawings correspond to one preferred embodiment of the present invention and are non-limited by the preferred embodiment. And, the scope/extent of the right should be determined through the appended claims.

'Digital device' described in the present specification includes any device capable of performing at least one of transmission, reception, processing and output of data, content, service, application and the like for example. The digital device can be paired or connected (hereinafter 'paired') with another digital device, an external server and the like through wire/wireless network and transmit/receive prescribed data through the pairing. In doing so, if necessary, the data may be appropriately converted before the transmission/reception. The digital devices may include standing devices (e.g., Network TV, HBBTV (Hybrid Broadcast Broadband TV), Smart TV, IPTV (Internet Protocol TV), PC (Personal Computer), etc.) and mobile devices (e.g., PDA (Personal Digital Assistant), Smart Phone, Tablet PC, Notebook, etc.). In the present specification, to help the understanding of the present invention and the clarity of the applicant's description, a digital TV and a mobile are shown as embodiments of digital devices in FIG. 2 and FIG. 3, respectively. A digital device described in the present specification may include a panel-only configuration, a configuration such as a set-top box (STB), or a single set configuration of device, system and the like.

Meanwhile, 'wire/wireless network' described in the present specification is a common name of a communication network supportive of various communication specifications and/or protocols for the paring or/and data transceiving between digital devices or between a digital device and an external server. Such wire/wireless networks include all communication networks supported currently or all communication networks that will be supported in the future, by the specifications and are capable of supporting one or more communication protocols for the same. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), Wi-Fi direct).

Besides, if a device is named a digital device in this disclosure, the meaning may indicate a standing device or a mobile device according to a context, or can be used to indicate both unless mentioned specially.

Meanwhile, a digital device is an intelligent device supportive of a broadcast receiving function, a computer function or support, at least one external input and the like, and is able to support e-mail, web browsing, banking, game, application and the like through the aforementioned wire/wireless network. Moreover, the digital device may include an interface (e.g., manual input device, touchscreen, space remote controller, etc.) to support at least one input or control means.

Besides, a digital device may use a standardized OS (operating system). Particularly, a digital device described in the present specification uses Web OS for one embodiment. Hence, a digital device can process adding, deleting, amending, updating and the like of various services or applications on Universal OS kernel or Linux kernel, through which a further user-friendly environment can be configured and provided.

Meanwhile, the aforementioned digital device can receive and process an external input. Herein, the external input includes an external input device, i.e., any input means or digital device capable of transmitting/receiving and processing data by being connected to the aforementioned digital device through wire/wireless network. For instance, as the external inputs, a game device (e.g., HDMI (High-Definition Multimedia Interface), Playstation, X-Box, etc.), a printing device (e.g., smart phone, tablet PC, pocket photo, etc.), and a digital device (e.g., smart TV, Blu-ray device, etc.) are included.

Besides, 'server' described in the present specification means a digital device or system that supplies data to the aforementioned digital device (i.e., client) or receives data from it, and may be called a processor. For example, the server may include a portal server providing web page, web content or web service, an advertising server providing advertising data, a content server providing contents, an SNS server providing SNS (Social Network Service), a service server provided by a manufacturer, an MVPD (Multichannel Video Programming Distributor) providing VoD (Video on Demand) or streaming service, a service server providing a pay service and the like.

Moreover, in case that the following description is made using an application only for clarity in the present specification, it may mean a service as well as an application on the basis of a corresponding content and the like.

In the following description, the present invention is explained in detail with reference to attached drawings.

FIG. 1 is a schematic diagram illustrating a service system including a digital device according to one embodiment of the present invention.

Referring to FIG. 1, a service system may include a content provider (CP) 10, a service provider (SP) 20, a network provider (NP) 30, and a home network end user (HNED) (Customer) 40. The HNED 40 includes a client 100, that is, a digital device according to the present invention.

The CP 10 produces and provides various contents. Referring to FIG. 1, the CP 10 can include a terrestrial broadcaster, a cable system operator (SO), a multiple system operator (MSO), a satellite broadcaster, various Internet broadcasters, private content providers (CPs), etc. Meanwhile, the CP 10 can produce and provide various services, applications and the like as well as well as broadcast contents.

The SP 20 service-packetizes a content produced by the CP 10 and then provides it to the HNED 40. For instance, the SP 20 packetizes at least one of contents, which are produced by a first terrestrial broadcaster, a second terrestrial broadcaster, a cable MSO, a satellite broadcaster, various internet broadcasters, applications and the like, for a service and then provides it to the HNED 40.

The SP 20 can provide services to the client 100 in a uni-cast or multi-cast manner. Meanwhile, the SP 20 can collectively send data to a multitude of pre-registered clients 100. To this end, it is able to use IGMP (internet group management protocol) and the like.

The CP 10 and the SP 20 can be configured in the form of one entity. For example, the CP 10 can function as the SP 20 by producing a content, service-packetizing the produced content, and then providing it to the HNED 40, and vice versa.

The NP 30 provides a network environment for data exchange between the CP 10 and/or the SP 20 and the client 100.

The client 100 is a consumer belonging to the HNED 40. The client 100 may receive data by establishing a home network through the NP 30 for example and transmit/receive data for various services (e.g., VoD, streaming, etc.), applications and the like.

The CP 10 or/and the SP 20 in the service system may use a conditional access or content protection means for the protection of a transmitted content. Hence, the client 100 can use a processing means such as a cable card (CableCARD) (or POD (point of deployment) or a downloadable CAS (DCAS), which corresponds to the conditional access or the content protection.

In addition, the client 100 may use an interactive service through a network as well. In this case, the client 100 can directly serve as a content provider. And, the SP 20 may receive and transmit it to another client or the like.

In FIG. 1, the CP 10 or/and the SP 20 may be a service providing server that will be described later in the present specification. In this case, the server may mean that the NP 30 is owned or included if necessary. In the following description, despite not being specially mentioned, a service or a service data includes an internal service or application as well as a service or application received externally, and such a service or application may mean a service or application data for the Web OS based client 100.

Figure 2:
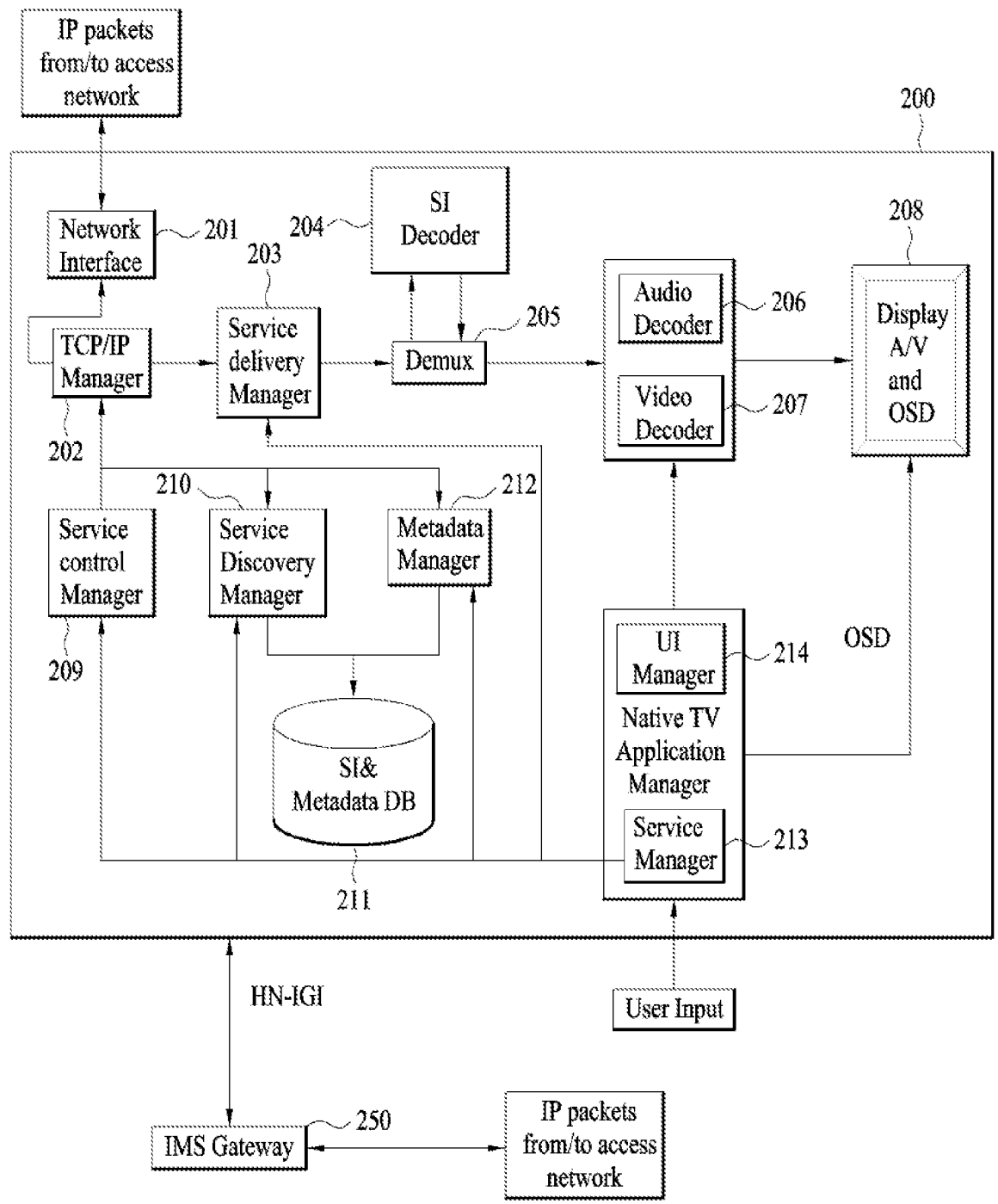
FIG. 2 is a schematic block diagram illustrating a digital device according to one embodiment of the present disclosure.

FIG. 2 is a block diagram showing a digital device according to one embodiment of the present invention.

In the following, a digital device mentioned in the present specification may correspond to the client 100 shown in FIG. 1.

The digital device 200 may include a network interface 201, a TCP/IP manager 202, a service delivery manager 203, an SI decoder 204, a demux or demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI manager 214, etc.

The network interface 201 may transmit/receive IP (internet protocol) packet(s) or IP datagram(s) (hereinafter named IP pack(s)) through an accessed network. For instance, the network interface 201 may receive services, applications, contents and the like from the service provider 20 shown in FIG. 1 through a network.

The TCP/IP manager 202 may involve delivery of IP packets transmitted to the digital device 200 and IP packets transmitted from the digital device 200, that is, packet delivery between a source and a destination. The TCP/IP manager 202 may classify received packet(s) according to an appropriate protocol and output the classified packet(s) to the service delivery manager 205, the service discovery manager 210, the service control manager 209, the metadata manager 212, and the like.

The service delivery manager 203 may be in charge of controlling the received service data. The service delivery manager 203 may control real-time streaming data, for example, using RTP/RTCP. In case of transmitting the real-time streaming data using RTP, the service delivery manager 203 may parse the received data packet according to the RTP and then transmits the parsed data packet to the demultiplexer 205 or save the parsed data packet to the SI & metadata DB 211 under the control of the service manager 213. The service delivery manager 203 may feed back the network reception information to the service providing server side using RTCP.

The demultiplexer 205 may demultiplex a received packet into audio data, video data, SI (system information) data and the like and then transmit the demultiplexed data to the audio/video decoder 206/207 and the SI decoder 204, respectively.

The SI decoder 204 may decode the demultiplexed SI data, i.e., service informations of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 204 may save the decoded service informations to the SI & metadata DB 211. The saved service information can be used by being read by a corresponding component in response to a user's request for example.

The audio decoder 206 and the video decoder 207 may decode the demultiplexed audio data and the demultiplexed video data, respectively. The decoded audio and video data may be provided to the user through the display unit 208.

The application manager includes a service manager 213 and a user interface (UI) manager 214 and is able to perform a function of a controller of the digital device 200. So to speak, the application manager can administrate the overall states of the digital device 200, provide a user interface (UI), and manage other mangers.

The UI manager 214 provides a graphical user interface/user interface (GUI/UI) using OSD (on screen display) and the like. The UI manager 214 receives a key input from a user and then performs a device operation according to the input. For instance, if receiving a key input about a channel selection from a user, the UI manager 214 transmits the key input signal to the service manager 213.

The service manager 213 may control and manage service-related managers such as the service delivery manager 203, the service discovery manager 210, the service control manager 209, and the metadata manager 212.

The service manager 213 creates a channel map and controls a selection of a channel and the like using the created channel map in response to a key input received from the UI manager 214. The service manager 213 may receive service information from the SI decoder 204 and then sets an audio/video PID of a selected channel for the demultiplexer 205. Such a PID can be used for the demultiplexing procedure. Therefore, the demultiplexer 205 performs filtering (PID or section filtering) on audio data, video data and SI data using the PID.

The service discovery manager 210 may provide information required to select a service provider that provides a service. Upon receipt of a signal for selecting a channel from the service manager 213, the service discovery manager 210 searches for a service using the information.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming. And, the service control manager 209 may initialize and manage a session through the IMS gateway 250 using IMS (IP multimedia subsystem) and SIP (session initiation protocol). The protocols are exemplary, and other protocols are usable according to implementations.

The metadata manager 212 may manage metadata associated with services and save the metadata to the SI & metadata DB 211.

The SI & metadata DB 211 may store service information decoded by the SI decoder 204, metadata managed by the metadata manager 212, and information required to select a service provider, which is provided by the service discovery manager 210. In addition, the SI & metadata DB 211 can store system set-up data and the like for the system.

The SI & metadata database 211 may be implemented with non-volatile RAM (NVRAM), flash memory and the like.

Meanwhile, an IMS gateway 250 is a gateway in which functions required for an access to an IMS based IPTV service are collected.

Figure 3:
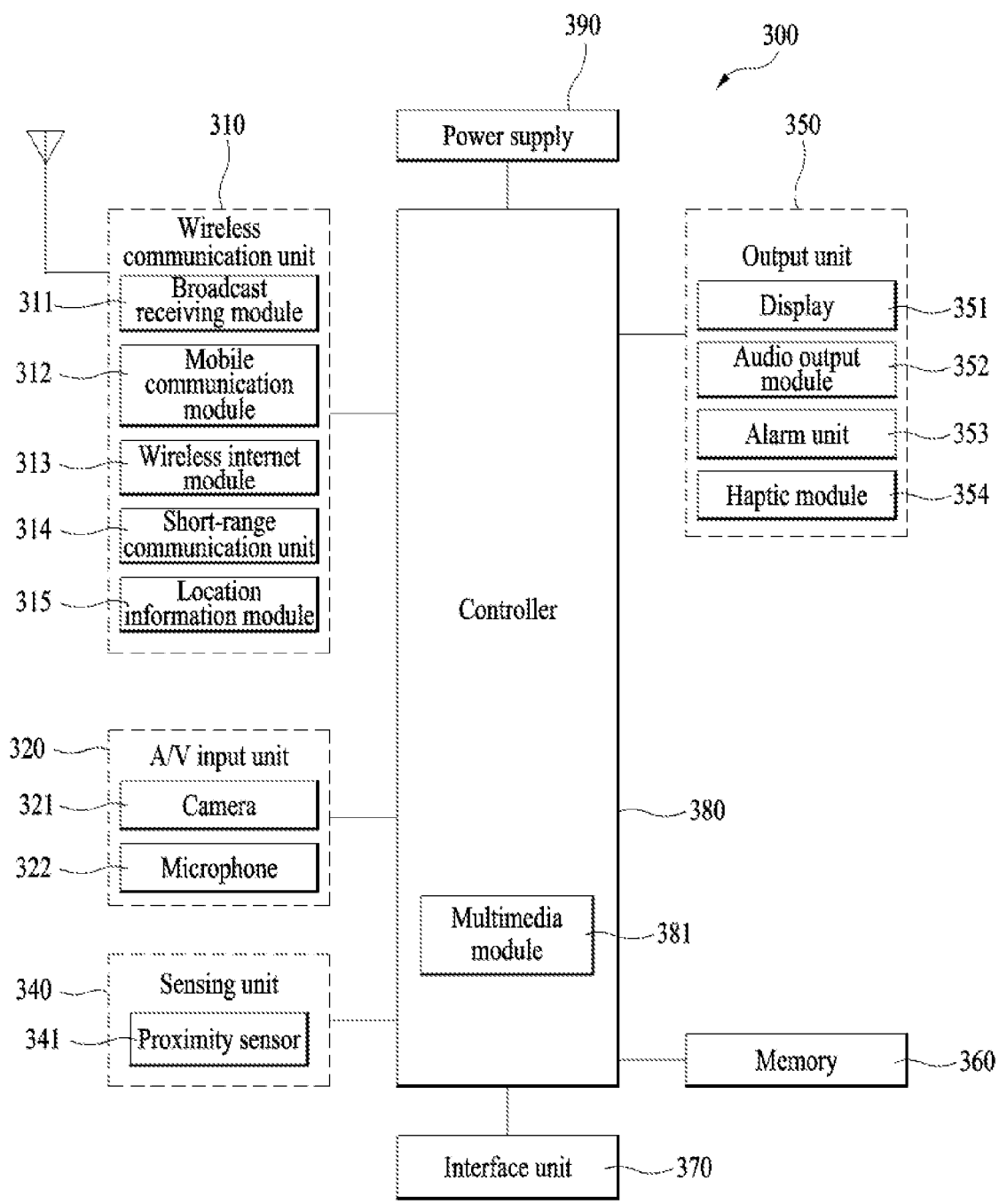
FIG. 3 is a schematic block diagram illustrating a digital device according to another embodiment of the present disclosure.

FIG. 3 is a block diagram to describe a digital device according to another embodiment of the present invention.

The former description with reference to FIG. 2 is made by taking a standing device as one embodiment of a digital device. And, FIG. 3 uses a mobile device as another embodiment of a digital device.

Referring to FIG. 3, the mobile device 300 includes a wireless communication unit 310, an A/V (audio/video) input unit 320, a user input unit 330, a sensing unit 340, an output unit 350, a memory 360, an interface unit 370, a controller 380, a power supply unit 390, etc.

The respective components are described in detail as follows.

The wireless communication unit 310 typically includes one or more modules which permit wireless communication between the mobile device 300 and a wireless communication system or network within which the mobile device 300 is located. For instance, the wireless communication unit 310 can include a broadcast receiving module 311, a mobile communication module 312, a wireless Internet module 313, a short-range communication module 314, a location information module 315, etc.

The broadcast receiving module 311 receives a broadcast signal and/or broadcast associated information from an external broadcast managing server via a broadcast channel. The broadcast channel may include a satellite channel and a terrestrial channel. The broadcast managing server may mean a server generating to send a broadcast signal and/or broadcast associated information or a server receiving to send a pre-generated broadcast signal and/or broadcast associated information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms, e.g., an electronic program guide (EPG), an electronic service guide (ESG), and the like.

The broadcast receiving module 311 may be configured to receive digital broadcast signals using broadcasting systems such as ATSC, DVB-T (Digital Video Broadcasting-Terrestrial), DVB-S(Satellite), MediaFLO (Media Forward Link Only), DVB-H (Handheld), ISDB-T (Integrated Services Digital Broadcast-Terrestrial), and the like. Optionally, the broadcast receiving module 311 can be configured to be suitable for other broadcasting systems as well as the above-noted digital broadcasting systems.

The broadcast signal and/or broadcast associated information received by the broadcast receiving module 311 may be saved to the memory 360.

The mobile communication module 312 transmits/receives wireless signals to/from at least one of a base station, an external terminal, and a server via a mobile network. Such wireless signals may carry audio signals, video signals, and data of various types according to transceived text/multimedia messages.

The wireless Internet module 313 includes a module for wireless Internet access and may be internally or externally coupled to the mobile device 300. The wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 314 is a module for short-range communications. Suitable technologies for implementing this module include Bluetooth, radio frequency identification (RFID), infrared data association (IrDA), ultra-wideband (UWB), ZigBee, RS-232, RS-485 and the like.

The location information module 315 is a module for obtaining location information of the mobile terminal 100. And, this module may be implemented with a global positioning system (GPS) module for example.

The audio/video (A/V) input unit 320 is configured to provide audio or video signal input. The A/V input unit 320 may include a camera 321, a microphone 322 and the like. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or transmitted externally via the wireless communication unit 310. Optionally, at least two cameras 321 can be provided according to the environment of usage.

The microphone 322 receives an external audio signal in call mode, recording mode, voice recognition mode, or the like. This audio signal is processed and converted into electrical audio data. The processed audio data is transformed into a format transmittable to a mobile communication base station via the mobile communication module 312 in call mode. The microphone 322 typically includes assorted noise cancelling algorithms to cancel noise generated in the course of receiving the external audio signal.

The user input unit 330 generates input data for a user to control an operation of the terminal. The user input unit 330 may include a keypad, a dome switch, a touchpad (e.g., static pressure/capacitance), a jog wheel, a jog switch, and/or the like.

The sensing unit 340 generates sensing signals for controlling operations of the mobile device 300 using status measurements of various aspects of the mobile terminal. For instance, the sensing unit 340 may detect an open/closed status of the mobile device 300, a location of the mobile device 300, an orientation of the mobile device 300, a presence or absence of user contact with the mobile device 300, an acceleration/deceleration of the mobile device 300, and the like. For example, if the mobile device 300 is moved or inclined, it is able to sense a location or inclination of the mobile device. Moreover, the sensing unit 340 may sense a presence or absence of power provided by the power supply unit 390, a presence or absence of a coupling or other connection between the interface unit 370 and an external device, and the like. Meanwhile, the sensing unit 340 may include a proximity sensor 341 such as NFC (near field communication) and the like.

The output unit 350 generates output relevant to the senses of vision, hearing and touch, and may include the display 351, an audio output module 352, an alarm unit 353, a haptic module 354, and the like.

The display 351 is typically implemented to visually display (output) information processed by the mobile device 300. For instance, if the mobile terminal is operating in phone call mode, the display will generally provide a user interface (UI) or graphical user interface (GUI) related to a phone call. For another instance, if the mobile device 300 is in video call mode or photographing mode, the display 351 may display photographed or/and received images or UI/GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile device 300 may include one or more of such displays.

Some of the displays can be implemented in a transparent or optical transmittive type, which can be called a transparent display. A representative example of the transparent display is the TOLED (transparent OLED). A rear configuration of the display 351 can be implemented as the optical transmittive type as well. In this configuration, a user may be able to see an object located in rear of a terminal body through a region occupied by the display 351 of the terminal body.

Two or more displays 351 can be provided to the mobile device 300 in accordance with an implementation type of the mobile device 300. For instance, a plurality of displays can be disposed on the mobile device 300 in a manner of being spaced apart from a single face or being integrally formed on a single face. Alternatively, a plurality of displays may be disposed on different faces of the mobile device 300, respectively.

If the display 351 and a sensor (hereinafter called 'touch sensor') for detecting a touch action configure a mutual layer structure, the display 351 is usable as an input device as well as an output device. In this case, the touch sensor can be configured with a touch film, a touch sheet, a touchpad, or the like.

The touch sensor can be configured to convert a pressure applied to a specific portion of the display 351 or a variation of capacitance generated from a specific portion of the display 351 into an electrical input signal. Moreover, the touch sensor is configurable to detect pressure of a touch as well as a touched position or size.

If a touch input is applied to the touch sensor, signal(s) corresponding to the touch input is transferred to a touch controller. The touch controller processes the signal(s) and then transfers the processed signal(s) to the controller 380. Therefore, the controller 380 is able to know whether a prescribed portion of the display 351 is touched.

A proximity sensor 341 can be disposed on an inner region of the mobile device enclosed by the touchscreen or near the touchscreen. The proximity sensor is a sensor that detects a presence or non-presence of an object approaching a prescribed detecting surface or an object existing around the proximity sensor using an electromagnetic field strength or infrared ray without mechanical contact. Hence, the proximity sensor is more durable than a contact type sensor and also has utility higher than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, etc. If the touch screen includes the electrostatic capacity proximity sensor, it is configured to detect the proximity of a pointer using a variation of an electric field according to the proximity of the pointer. In this configuration, the touchscreen (or touch sensor) can be sorted into a proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or stored in the memory 360. During operation, the audio output module 352 may output an audio signal related to a function (e.g., call received, message received) executed in the mobile device 300. The audio output module 352 may include a receiver, a speaker, a buzzer and the like.

The alarm unit 353 outputs a signal for announcing the occurrence of an event of the mobile device 300. Typical events occurring in the mobile device may include a call signal received, a message received, a touch input received, and the like. The alarm unit 353 may output a signal for announcing the event occurrence by way of vibration as well as video or audio signal. The video or audio signal can be outputted via the display 351 or the audio output module 352. Hence, the display 351 or the audio output module 352 can be sorted into a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence. The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, two or more haptic modules 354 can be provided to the mobile device 300 in accordance with a configuration type of the mobile device 300.

The memory 360 may store a program for an operation of the controller 380, or may temporarily store inputted/outputted data (e.g., phonebook, message, still image, video, etc.). And, the memory 360 may store data of vibrations and sounds of various patterns outputted in response to a touch input to the touchscreen.

The memory 360 may be implemented using any type or combination of suitable volatile and non-volatile memory or storage devices, including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile device 300 is able to operate in association with the web storage for performing a storage function of the memory 360 on the Internet.

The interface unit 370 may play a role as a passage to every external device connected to the mobile device 300 with external devices. The interface unit 370 receives data from the external devices, delivers a supplied power to the respective elements of the mobile device 300, or enables data within the mobile device 300 to be transferred to the external devices. For instance, the interface unit 370 may include a wired/wireless headset port, an external charger port, a wired/wireless data port, a memory card port, a port for coupling to a device having an identity module, audio input/output ports, video input/output ports, an earphone port, and the like.

The identity module is a chip for storing various kinds of information for authenticating a use authority of the mobile device 300 and may include User Identify Module (UIM), Subscriber Identity Module (SIM), Universal Subscriber Identity Module (USIM), and the like. A device having the identity module (hereinafter called 'identity device') can be manufactured in form of a smart card. Therefore, the identity device is connectible to the mobile device 300 through a port.

When the mobile device 300 is connected to an external cradle, the interface unit 370 becomes a passage for supplying the mobile device 300 with a power from the cradle or a passage for delivering various command signals input from the cradle by a user to the mobile device 300. Each of the various command signals inputted from the cradle or the power can operate as a signal for recognizing that the mobile device 300 is correctly installed in the cradle.

The controller 380 typically controls the overall operations of the mobile device 300. For example, the controller 380 performs the control and processing associated with voice calls, data communications, video calls, and the like. The controller 380 may include a multimedia module 381 that provides multimedia playback. The multimedia module 381 may be configured as a part of the controller 380, or implemented as a separate component. Moreover, the controller 380 is able to perform a pattern recognition processing for recognizing a writing input and a picture drawing input performed on the touchscreen as a text and an image, respectively.

The power supply unit 390 is supplied with an external or internal power and then supplies a power required for an operation of each component, under the control of the controller 380.

Various embodiments described herein may be implemented in a recording medium readable by a computer or a device similar to the computer using software, hardware, or some combination thereof for example.

For hardware implementation, the embodiments described herein may be implemented within at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and a selective combination thereof. Such embodiments may also be implemented by the controller 180.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 360, and executed by a controller or processor, such as the controller 380.

Figure 4:
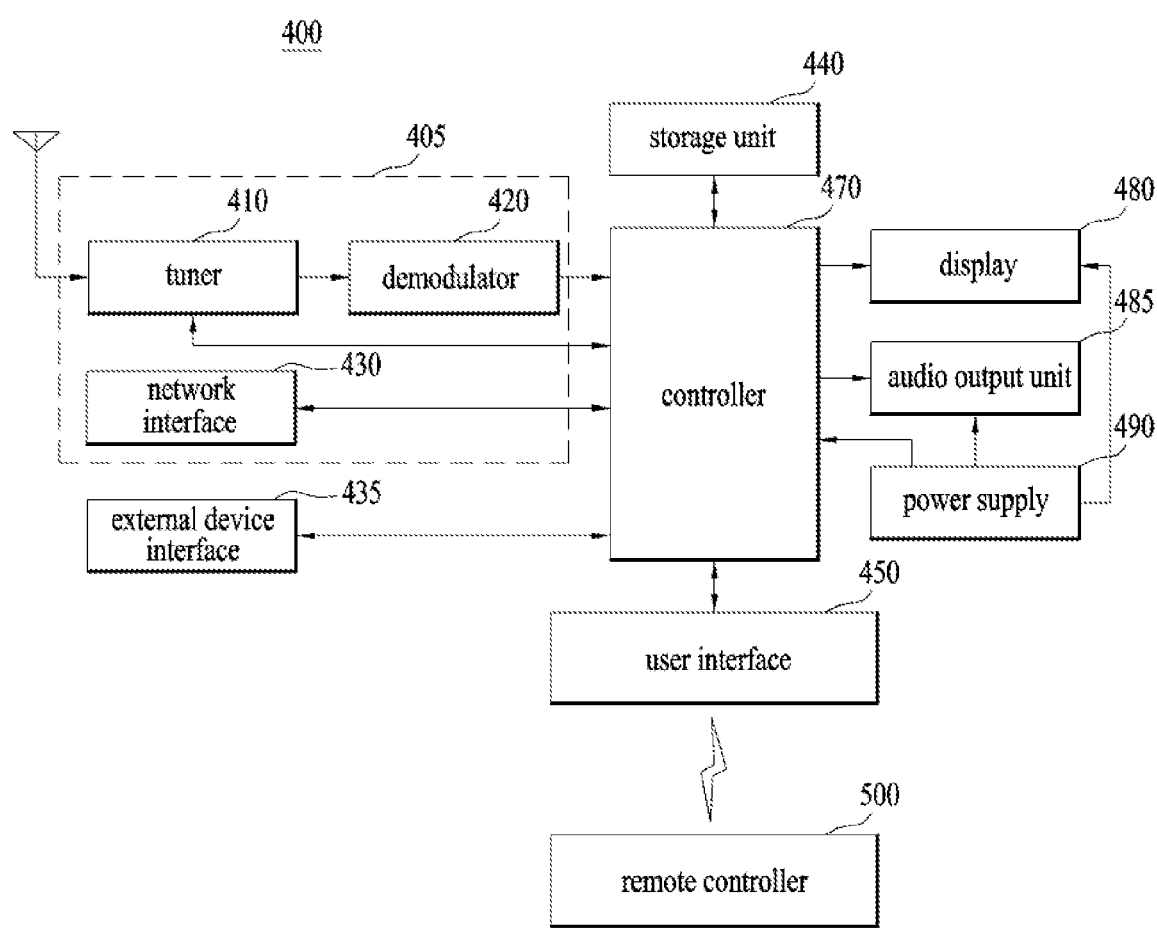
FIG. 4 is a schematic block diagram illustrating a digital device according to still another embodiment of the present disclosure.

FIG. 4 is a block diagram showing a digital device according to another embodiment of the present invention.

Another example of a digital device 400 may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. Yet, in some cases, the broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning in to a channel selected by the user or all previously stored channels among RF broadcast signals received through an antenna. And, the tuner 410 converts the received RF broadcast signal into an IF (intermediate frequency) signal or a baseband signal.

For instance, if a received RF broadcast signal is a digital broadcast signal, it is converted into a digital IF (DIF) signal. If a received RF broadcast signal is an analog signal, it is converted into an analog baseband video/audio signal (CVBS/SIF). Namely, the tuner 410 is able to process both of the digital broadcast signal and the analog signal. The analog baseband video/audio signal (CVBS/SIF) outputted from the tuner 410 may be directly inputted to the controller 470.

The tuner 410 may receive an RF broadcast signal of a single carrier or multiple carriers. The tuner 410 sequentially tunes in to and receives RF broadcast signals of all broadcast channels stored through the channel memory function among RF broadcast signals received through the antenna and is then able to convert it into an intermedia frequency signal or a baseband signal (DIF: digital intermediate frequency or baseband signal).

The demodulator 420 receives and demodulates the digital IF signal (DIF) converted by the tuner 410 and is then able to channel decoding and the like. To this end, the demodulator 420 may include a Trellis decoder, a de-interleaver, a Reed-Solomon decoder and the like, or may include a convolution decoder, a de-interleaver, a Reed-Solomon decoder and the like.

The demodulator performs demodulation and channel decoding and is then able to output a stream signal TS. In this case, the stream signal may include a signal of multiplexing a video signal, an audio signal and/or a data signal. For instance, the stream signal may include MPEG-2TS (transport stream) in which a video signal of PMEG-2 and an audio signal of Dolby AC-3 are multiplexed.

The stream signal outputted from the demodulator 420 may be inputted to the controller 470. The controller 470 can control demultiplexing, audio/video signal processing, etc. Furthermore, the controller 470 can control outputs of video and audio through the display 480 and o the audio output unit 485, respectively.

The external device interface 435 may provide an interfacing environment between the digital device 300 and various external devices. To this end, the external device interface 435 may include an A/V input/output unit (not shown) or a wireless communication unit (not shown).

The external device interface 435 can be connected with external devices such as a digital versatile disk (DVD), a Blu-ray player, a game device, a camera, a camcorder, a computer (notebook computer), a tablet PC, a smartphone, a cloud and the like by wire/wireless. The external device interface 435 delivers a signal containing data such as an image, a video, an audio and the like, which is inputted through the connected external device, to the controller 470 of the digital device. The controller 470 may control a data signal of the processed image, video and audio and the like to be outputted to the connected external device. To this end, the external device interface 435 may further include an A/V input/output unit (not shown) or a wireless communication unit (not shown).

In order to input video and audio signals of an external device to the digital device 400, the A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The wireless communication unit can perform short-range wireless communication with another digital device. The digital device 400 may be networked with other digital devices by communication protocols such as Bluetooth, radio frequency identification (RFID), infrared data association (IrDA), ultra wideband (UWB), ZigBee, and digital living network alliance (DLNA), etc. for example.

The external device interface 435 may perform input/output operations with a set-top box (STB) by being connected thereto through at least one of the aforementioned terminals.

Meanwhile, the external device interface 435 may receive an application or an application list within an adjacent external device and then forward it to the controller 470 or the storage unit 440.

The network interface 430 may provide an interface for connecting the digital device 400 to wired/wireless networks including Internet network. The network interface 430 may have Ethernet terminal and the like for an access to a wired network for example. For the access to the wireless network, the network interface 430 may use communication specifications such as WLAN (Wireless LAN) (Wi-Fi), Wibro (Wireless broadband), Wimax (World Interoperability for Microwave Access), HSDPA (High Speed Downlink Packet Access), etc.

The network interface 430 may transceive data with another user or another digital device through the accessed network or another network linked to the accessed network. Particularly, the network interface 430 may send a portion of the content data stored in the digital device 400 to a user/digital device selected from other users/digital devices previously registered at the digital device 400.

Meanwhile, the network interface 430 may access a prescribed webpage through the accessed network or another network linked to the accessed network. Namely, the network interface 430 accesses a prescribed webpage through a network and is then able to transceive data with a corresponding server. Besides, the network interface 430 can receive contents or data provided by a content provider or a network operator. Namely, the network interface 430 may receive contents (e.g., movie, advertisement, game, VOD, broadcast signal, etc.) provided by the content provider or a network provider and information associated with the contents through the network. The network interface 430 may receive update information and file of firmware provided by the network operator. And, the network interface 430 may send data to the internet or content provider or the network operator.

Moreover, the network interface 430 may select a desired application from open applications and receive it through a network.

The storage unit 440 may store programs for various signal processing and controls within the controller 470, and may also store a processed video, audio or data signal.

In addition, the storage unit 440 may execute a function of temporarily storing a video, audio or data signal inputted from the external device interface 435 or the network interface 430. The storage unit 440 may store information on a prescribed broadcast channel through a channel memory function.

The storage unit 440 may store an application or an application list inputted from the external device interface 435 or the network interface 430.

And, the storage unit 440 may store various platforms which will be described later.

The storage unit 440 may include storage media of one or more types, such as a flash memory type, a hard disk type, a multimedia card micro type, a card type memory (e.g. SD or XD memory), RAM, EEPROM, etc. The digital device 400 may play content files (a video file, a still image file, a music file, a text file, an application file, etc.) stored in the storage unit 440 and provide them to the user.

FIG. 4 illustrates an embodiment in which the storage unit 440 is separated from the controller 470, by which the present invention is non-limited. In other words, the storage unit 440 may be included in the controller 470.

The user input interface 450 may forward a signal inputted by a user to the controller 470 or forward a signal outputted from the controller 470 to the user.

For example, the user input interface 450 may receive control signals for power on/off, channel selection, screen settings and the like from a remote controller 500, or transmit control signals of the controller 470 to the remote controller 500, according to various communication schemes such as RF communication, IR communication, and the like.

The user input interface 450 can forward control signals inputted through a power key, a channel key, a volume key, and a local key (not shown) for a setup value or the like to the controller 470.

The user input interface 450 may forward a control signal inputted from a sensing unit (not shown) sensing a gesture of a user to the controller 470 or transmit a signal of the controller 470 to the sensing unit (not shown). Here, the sensing unit (not shown) may include a touch sensor, a voice sensor, a location sensor, an action sensor, etc.

The controller 470 may generate and output a signal for a video or audio output by demultiplexing a stream inputted through the tuner 410, the demodulator 420 or the external device interface 435 or processing demultiplexed signals.

A video signal processed by the controller 470 can be inputted to the display unit 380 and displayed as an image corresponding to the video signal. In addition, the video signal video-processed by the controller 470 can be inputted to an external output device through the external device interface 435.

An audio signal processed by the controller 470 can be audio-outputted to the audio output unit 485. Moreover, the audio signal processed by the controller 470 can be inputted to the external output device through the external device interface 435.

The controller 470 may include a demultiplexer, an image processor, and the like, which are not shown in FIG. 4.

The controller 470 can control the overall operations of the digital device 400. For example, the controller 470 can control the tuner 410 to tune in to an RF broadcast corresponding to a channel selected by a user or a previously stored channel.

The controller 470 can control the digital device 400 according to a user command input through the user input interface 450 or an internal program. Particularly, the controller 470 can control the digital device 400 to access a network to download an application or an application list desired by a user to the digital device 400.

For example, the controller 470 may control the tuner 410 to receive a signal of a channel selected in response to a prescribed channel selection command received through the user input interface 450. And, the controller 470 may process a video, audio or data signal of the selected channel. The controller 470 may control information on a channel selected by the user to be outputted together with a processed video or audio signal through the display unit 480 or the audio output unit 485.

For another example, the controller 470 may control a video signal or an audio signal, which is inputted through the external device interface unit 435 from an external device (e.g., a camera or a camcorder), to be outputted through the display unit 480 or the audio output unit 485 in response to an external device image play command received through the user input interface 450.

Meanwhile, the controller 470 can control the display unit 480 to display a video. For example, the controller 470 can control a broadcast video inputted through the tuner 410, an external input video inputted through the external device interface 435, a video inputted through the network interface 430, or a video stored in the storage unit 440 to be displayed on the display unit 480. Here, the video displayed on the display unit 480 may include a still image or moving images or may include a 2D or 3D video.

The controller 470 may control a content to be played. Here, the content may include a content stored in the digital device 400, a received broadcast content, or a content inputted externally. The content may include at least one of a broadcast video, an external input video, an audio file, a still image, an accessed web screen, and a document file.

The controller 470 may control an application or an application list, which is located in the digital device 300 or downloadable from an external network, to be displayed when an application view menu is entered.

The controller 470 may control installation and execution of applications downloaded from an external network together with various user interfaces. Moreover, the controller 470 can control a video related to a launched application to be displayed on the display unit 480 by a user's selection.

Meanwhile, a channel browsing processor (not shown) configured to generate a thumbnail image corresponding to a channel signal or an external input signal may be further included.

The channel browsing processor may receive an input of a stream signal (TS) outputted from the demodulator 420 or an input of a stream signal outputted from the external device interface 435, extract a video from the inputted stream signal, and then generate a thumbnail image. The generated thumbnail image can be directly inputted to the controller 470 or may be inputted to the controller 470 by being encoded. Moreover, the generated thumbnail image may be encoded into a stream and then inputted to the controller 470. The controller 470 may display a thumbnail list including a plurality of thumbnail images on the display unit 480 using the inputted thumbnail images. The thumbnail images included in the thumbnail list can be updated sequentially or simultaneously. Accordingly, the user can conveniently check content of a plurality of broadcast channels.

The display unit 480 may convert each of a video signal, a data signal, and an OSD signal processed by the controller 470 or each of a video signal and a data signal received from the external device interface 435 into R, G and B signals to generate a drive signals.

The display unit 480 may include a PDP, an LCD, an OLED, a flexible display, a 3D display, or the like.

The display unit 480 may be configured as a touchscreen and used as an input device as well as an output device.

The audio output unit 485 receives a signal audio-processed by the controller 470, for example, a stereo signal, a 3.1 channel signal or a 5.1 channel signal, and then outputs the received signal as audio. The audio output unit 485 may be configured as one of speakers of various types.

Meanwhile, the digital device 400 may further include the sensing unit (not shown) for sensing a gesture of the user, which includes at least one of a touch sensor, a voice sensor, a location sensor, and an action sensor, as described above. A signal sensed by the sensing unit (not shown) can be delivered to the controller 470 through the user input interface 450.

The digital device 400 may further include a photographing unit (not shown) for photographing a user. Image information acquired by the photographing unit (not shown) can be inputted to the controller 470.

The controller 470 may sense a gesture of a user from an image captured by the photographing unit (not shown) or a signal sensed by the sensing unit (not shown), or by combining the image and the signal.

The power supply unit 490 may supply a corresponding power to the digital device 400 overall.

Particularly, the power supply unit 490 can supply the power to the controller 470 configurable as a system-on-chip (SoC), the display unit 480 for a video display, and the audio output unit 485 for an audio output.

To this end, the power supply unit 490 may include a converter (not shown) configured to convert an AC power to a DC power. Meanwhile, for example, if the display unit 480 is configured as an LCD panel having a multitude of backlight lamps, the power supply unit 490 may further include an inverter (not shown) capable of PWM (pulse width modulation) operation for luminance variation or dimming drive.

The remote controller 500 sends a user input to the user input interface 450. To this end, the remote controller 500 can use Bluetooth, RF communication, IR communication, UWB, ZigBee, etc.

In addition, the remote controller 500 can receive audio, video or data signal outputted from the user input interface 450 and then display the received signal or output the same as audio or vibration.

The above-described digital device 400 may include a digital broadcast receiver capable of processing digital broadcast signals of ATSC or DVB of a stationary or mobile type.

Regarding the digital device according to the present invention, some of the illustrated components may be omitted or new components (not shown) may be further added as required. On the other hand, the digital device may not include the tuner and the demodulator, differently from the aforementioned digital device, and may play a content by receiving the content through the network interface or the external device interface.

Figure 5:
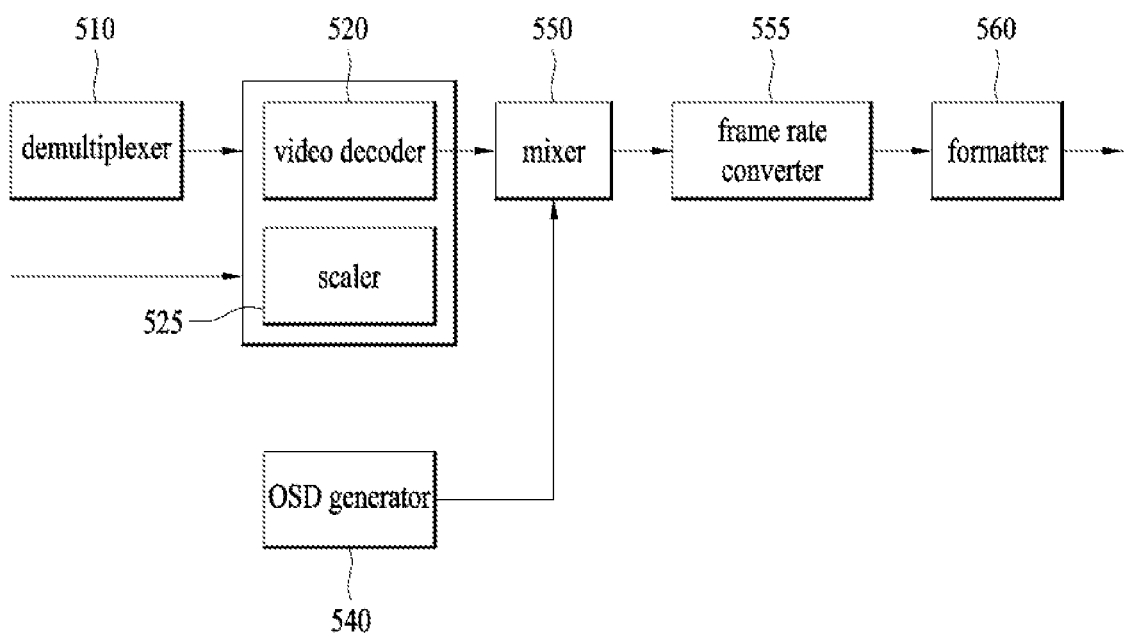
FIG. 5 is a schematic block diagram illustrating a detailed configuration of a controller of FIGS. 2 to 4 in accordance with one embodiment of the present disclosure.

FIG. 5 is a block diagram showing the detailed configuration of each of controllers of FIGS. 2 to 4 according to one embodiment of the present invention.

One example of the controller may include a demultiplexer 510, a video processor 520, an OSD generator 540, a mixer 550, a frame rate converter (FRC) 555, and a formatter 560. Besides, the controller may further include an audio processor and a data processor (not shown).

The demultiplexer 510 demultiplexes an inputted stream. For instance, the demultiplexer 510 can demultiplex an inputted stream signal into an MPEG-2 TS video, audio and data signals. Herein, the stream signal inputted to the demultiplexer may include a stream signal outputted from the tuner, demodulator or external device interface.

The video processor 520 performs a video processing of the demultiplexed video signal. To this end, the video processor 520 may include a video decoder 525 and a scaler 535.

The video decoder 525 can decode the demultiplexed video signal, and the scaler 535 can scale the resolution of the decoded video signal to be outputtable from the display.

The video decoder 525 can support various specifications. For instance, the video decoder 525 performs a function of MPEG-2 decoder if a video signal is encoded by MPEG-2. And, the video decoder 535 performs a function of H.264 decoder if a video signal is encoded by DMB (digital multimedia broadcasting) or H.264.

Meanwhile, the video signal decoded by the image processor 520 is inputted to the mixer 550.

The OSD generator 540 may generate OSD data according to a user input or by itself. For example, the OSD generator 540 may generate data to be displayed on the screen of the display 380 in the graphic or text form on the basis of a control signal of a user input interface. The generated OSD data may include various data such as a user interface screen of the digital device, various menu screens, widgets, icons, viewing rate information and the like. The OSD generator 540 can generate data to display a caption of a broadcast video or EPG based broadcast information.

The mixer 550 mixes the OSD data generated by the OSD generator 540 and the video signal processed by the video processor 520. The mixer 550 then provides the mixed signal to the formatter 560. By mixing the decoded video signal and the OSD data, OSD is displayed in a manner of overlaying a broadcast video or an external input video.

The frame rate converter (FRC) 555 may convert a frame rate of an inputted video. For example, the frame rate converter 555 can convert the frame rate of an inputted 60 Hz video into a frame rate of 120 Hz or 240 Hz according to an output frequency of the display unit. As described above, there may exist various methods of converting a frame rate. For instance, in case of converting a frame rate into 120 HZ from 60 Hz, the frame rate converter 555 can perform the conversion by inserting a first frame between the first frame and a second frame or inserting a third frame predicted from the first and second frames. For another instance, in case of converting a frame rate into 240 Hz from 60 Hz, the frame rate converter 555 can perform the conversion by further inserting three same or predicted frames between the existing frames. Meanwhile, in case of not performing a separate frame conversion, the frame rate converter 555 may be bypassed.

The formatter 560 may change the output of the frame rate converter 555, which is inputted thereto, to fit an output format of the display unit. For example, the formatter 560 can output an RGB data signal. In this case, this RGB data signal can be outputted as low voltage differential signal (LVDS) or mini-LVDS. If an inputted output of the frame rate converter 555 is a 3D video signal, the formatter 560 outputs the signal by configuring a 3D format to fit the output format of the display unit, whereby a 3D service can be supported through the display unit.

Meanwhile, an audio processor (not shown) in the controller can perform audio processing of a demultiplexed audio signal. Such an audio processor (not shown) can provide supports to process various audio formats. For instance, if an audio signal is encoded in format of MPEG-2, MPEG-4, AAC, HE-AAC, AC-3, B SAC, or the like, a corresponding decoder is further included to process the audio signal.

And, the audio processor (not shown) in the controller can process base, treble, volume adjustment and the like.

A data processor (not shown) in the controller can process a demultiplexed data signal. For example, when a demultiplexed data signal is encoded, the data processor can decode the encoded demultiplexed data signal. Here, the encoded data signal may be EPG information including broadcast information such as start and end times of a broadcast program broadcasted on each channel, and the like.

Meanwhile, the above-described digital device is one example according to the present invention. And, at least one of the components may be integrated, added or omitted depending on options of an actually embodied digital device. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention.

Meanwhile, a digital device may include an image signal processing device configured to process a signal of an image saved in the corresponding device or a signal of an inputted image. Examples of the image signal processing device may include a settop box (STB) failing to include the display unit 480 and the audio output unit 485 shown in FIG. 4, the aforementioned DVD player, a Blu-ray player, a game device, a computer and the like.

Figure 6:
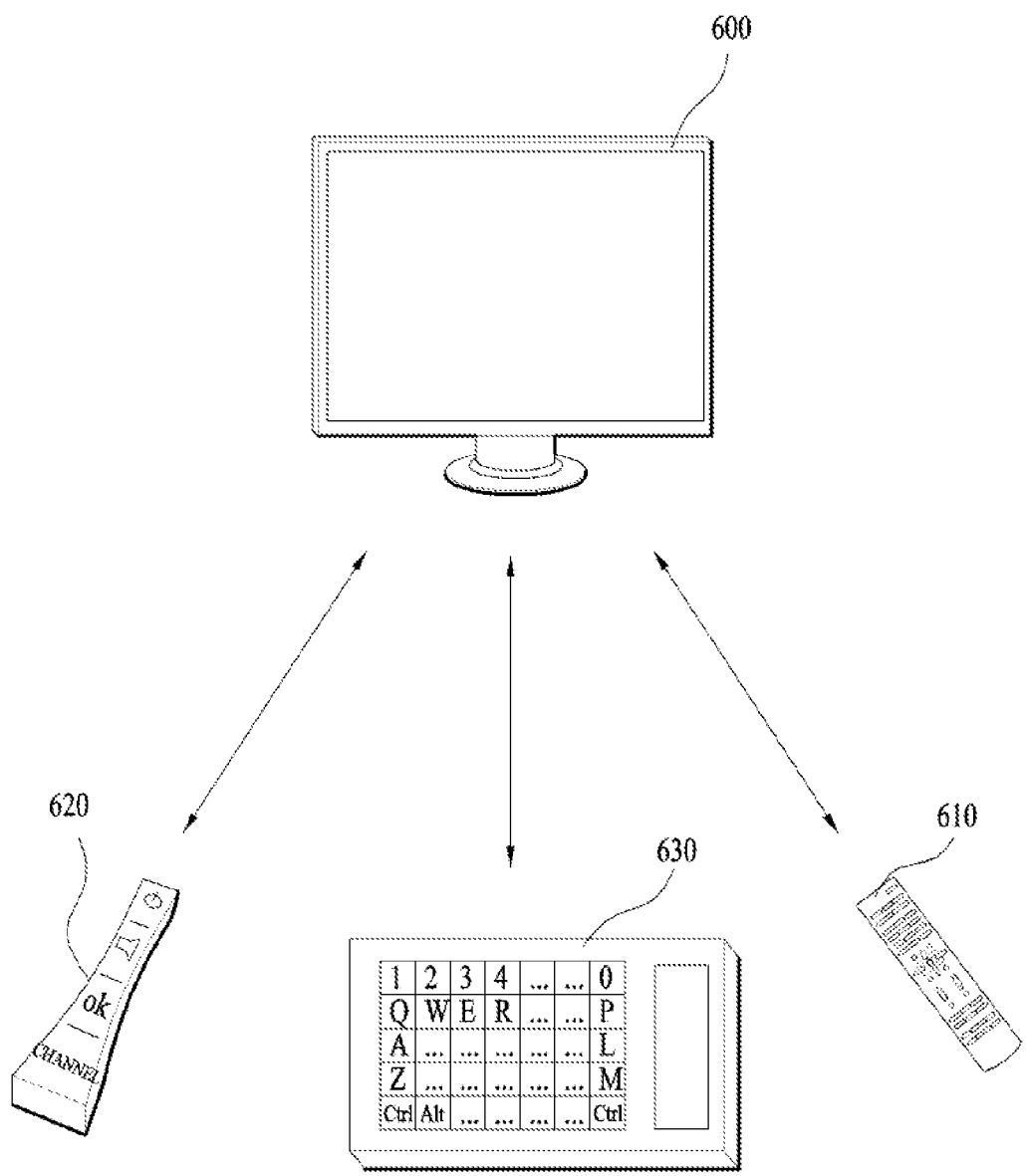
FIG. 6 is a view illustrating an input means connected with a digital device of FIGS. 2 to 4 according to one embodiment of the present disclosure.

FIG. 6 is a diagram of an input means connected to each of the digital devices shown in FIGS. 2 to 4 according to one embodiment of the present invention.

In order to control a digital device 600, a front panel (not shown in the drawing) or a control means (e.g., an input means) installed in the digital device 600 is used.

Meanwhile, as a user interface device (UID) capable of a wire/wireless communication, the control means includes a remote controller 610, a key board 630, a pointing device 620, a touchpad, or the like, mainly embodied for the purpose of controlling the digital device 600. And, a control means dedicated to an external input by being connected to the digital device 600 may be included as well. Besides, the control means may further include a mobile device (e.g., a smartphone, a tablet PC, etc.) capable of controlling the digital device 600 through a mode switching or the like despite not having the purpose of controlling the digital device 600. For clarity, a pointing device is taken as one example for the description in the present specification, by which the present invention is non-limited.

The input means can communicate with the digital device by employing at least one of communication protocols as necessary. In this case, the communication protocols may include Bluetooth, RFID (Radio Frequency Identification), IrDA (infrared Data Association), UWB (Ultra Wideband), ZigBee, DLNA (Digital Living Network Alliance), RS and the like.

The remote controller 610 is a general input means provided with various key buttons required for controlling the digital device 600.

The pointing device 620 provided with a gyro sensor and the like delivers a prescribed control command to the digital device 600 by embodying a corresponding pointer on a screen of the digital device 600 based on a user's motion, a pressure, a rotation and the like. The pointing device 620 may be called one of various names such as a magic remote controller, a magic controller and the like.

As the digital device 600 is an intelligence integrated digital device capable of providing various services such as a web browser, an application, an SNS (social network service) and the like as well as broadcasts, it is difficult to control the digital device 600 using a conventional remote controller 610. Hence, the keyboard 630 is embodied into a configuration similar to a PC keyboard to facilitate inputs of text and the like by complementing the control difficulty.

Meanwhile, the control means such as the remote controller 610, the pointing device 620, the keyboard 630, or the like is provided with a touchpad as necessary and is usable for the various control purposes of facilitating text inputs, pointer shifts, zoom-in/out of photo or video, and the like.

The digital device described in the present specification uses OS and/or Web OS as a platform. Hereinafter, such a processing as a WebOS based configuration or algorithm may be performed by the controller of the above-described digital device and the like. In this case, the controller is used in a broad sense including the controllers shown in FIGS. 2 to 5. Hence, in the following description, regarding a configuration for processing WebOS based or related services, applications, contents and the like in a digital device, hardware or component including software, firmware and the like is named a controller.

Such a Web OS based platform may improve development independency and functional extensibility by integrating services, applications and the like based on Luna-service Bus for example and is able to increase application development productivity based on a web application framework. In addition, system resources and the like are efficiently used through a WebOS process and resource management, whereby multitasking can be supported.

Meanwhile, a Web OS platform described in the present specification may be available not only for stationary devices such as personal computers (PCs), TVs and settop boxes (STBs) but also for mobile devices such as cellular phones, smartphones, tablet PCs, laptops, wearable devices, and the like.

A software structure for a digital device is a monolithic structure capable of solving conventional problems depending on markets and has difficulty in external application with a multi-threading based signal process and closed product. In pursuit of new platform based development, cost innovation through chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
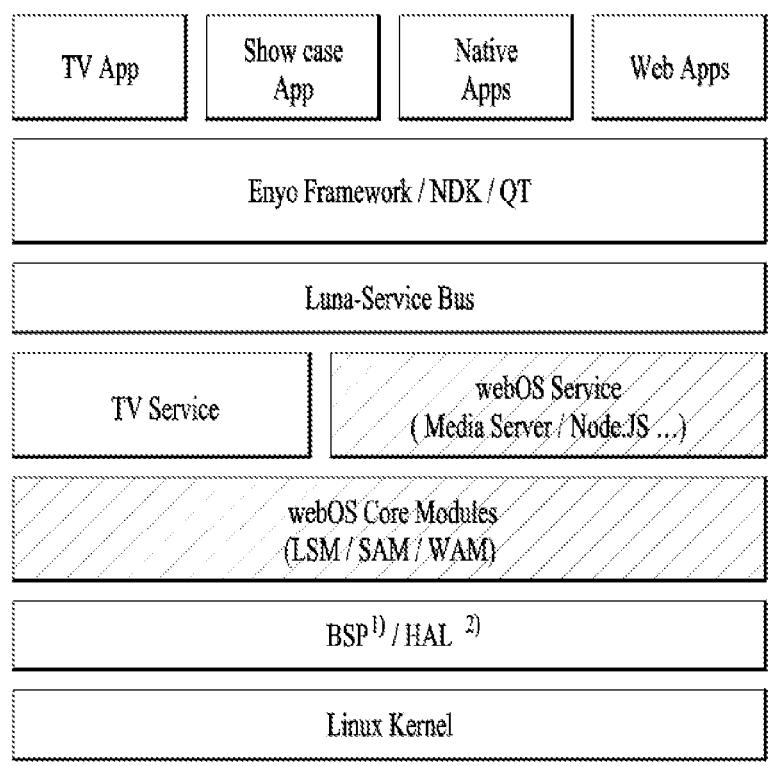
FIG. 7 is a view illustrating a web OS architecture according to one embodiment of the present disclosure.

FIG. 7 is a diagram showing Web OS architecture according to one embodiment of the present invention.

The architecture of Web OS platform is described with reference to FIG. 7 as follows.

The platform can be mainly classified into a system library based Web OS core platform, an application, a service and the like.

The architecture of the Web OS platform includes a layered structure. OS, system library(s), and applications exist in a lowest layer, a next layer and a most upper layer, respectively.

First of all, regarding the lowest layer, as a Linux kernel is included as an OS layer, Linux may be included as an OS of the digital device.

Above the OS layer, BSP/HAL (Board Support Package/Hardware Abstraction layer, Web OS core modules layer, service layer, Luna-Service Bus layer, Enyo framework/NDK (Native Developer's Kit)/QT layer, and an application layer (as a most upper layer) exist in order.

Meanwhile, some layers can be omitted from the aforementioned Web OS layer structure. A plurality of layers can be integrated into a single layer, and vice versa.

The Web OS core module layer may include LSM (Luna Surface Manager) for managing a surface window and the like, SAM (System & Application Manage) for managing launch, running state and the like of an application, WAM (Web Application Manager) for managing Web application and the like based on WebKit, etc.

The LSM manages an application window appearing on a screen. The LSM is in charge of a display hardware (HW), provides a buffer capable of rendering substance required for applications, and outputs a composition of rendering results of a plurality of application to a screen.

The SAM manages a performance policy per conditions of system and application.

Meanwhile, since Web OS may regard a web application (Web App) as a basic application, the WAM is based on Enyo Framework.

A service use of application is performed through Luna-service Bus. A new service may be registered as the Bus, and an application can find and use a service required for itself.

The service layer may include services of various service levels such as TV service, Web OS service and the like. Meanwhile, the Web OS service may include a media server, a Node.JS and the like. Particularly, Node.JS service supports javascript for example.

The Web OS service is Linux process of implementing a function logic and can communicate through Bus. This can be mainly divided into four parts and is constructed with a TV process, services migrating into Web OS from an existing TV or services corresponding to manufacturer-differentiated services, Web OS common service, and Node.js service developed with javascript and used through Node.js.

The application layer may include all applications supportable by the digital device, e.g., TV application, showcase application, native application Web application, etc.

Application on Web OS may be sorted into Web Application, PDK (Palm Development Kit) application, QML (Qt Meta Language or Qt Modeling Language) application and the like according to implementing methods.

The Web Application is based on WebKit engine and is run on WAM Runtime. Such a web application is based on Enyo Framework or may be run in a manner of being developed based on general HTML5, CSS (cascading style sheets), and javascript.

The PDK application includes a native application and the like developed with C/C++ based on PDK provided for a $3^{rd}$ party or an external developer. The PDK means a set of development libraries and tools provided to enable a third party (e.g., a game, etc.) to develop a native application (C/C++). The PDK application can be used to develop an application of which performance is significant.

The QML application is a Qt based native application and includes basic applications (e.g., card view, home dashboard, virtual keyboard, etc.) provided with Web OS platform. Herein, QML is a mark-up language of a script type instead of C++.

Meanwhile, in the above description, the native application means an application that is developed with C/C++, complied, and run in binary form. Such a native application has an advantage of a fast running speed.

Figure 8:
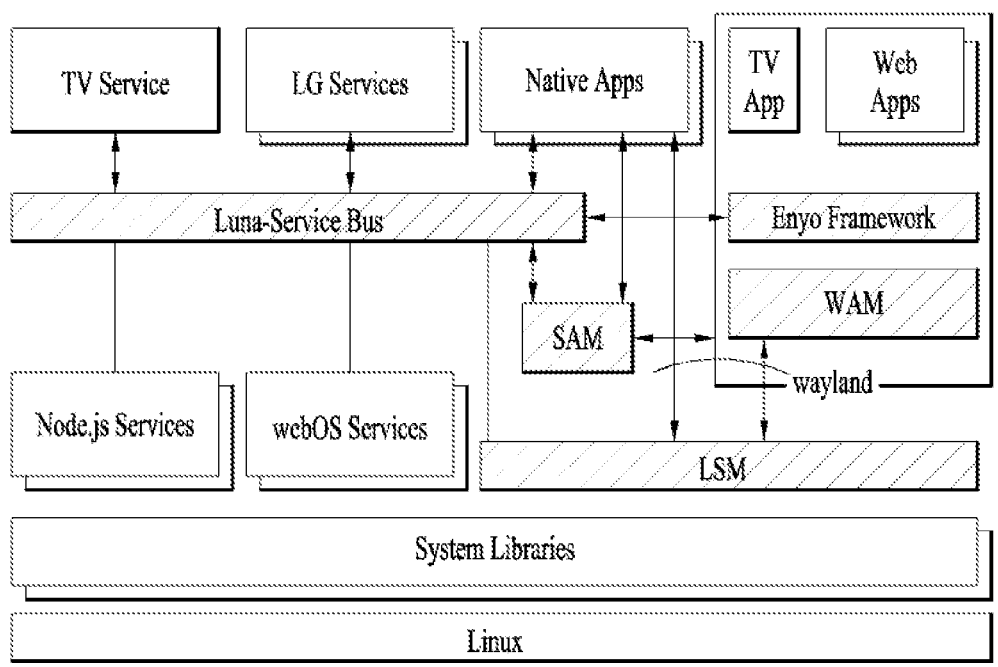
FIG. 8 is a view illustrating an architecture of a web OS device according to one embodiment of the present disclosure.

FIG. 8 is a diagram showing an architecture of Web OS device according to one embodiment of the present invention.

FIG. 8 is a block diagram based on a runtime of a Web OS device, which can be understood with reference to the layered structure shown in FIG. 7.

The following description is made with reference to FIG. 7 and FIG. 8.

Referring to FIG. 8, above a system OS (Linux) and system libraries, services, applications and Web OS core modules are included. And, communications among them can be performed through Luna-Service-Bus.

Node.js services (e-mail, contact, calendar, etc.) based on HTML5, CSS, and java script, Web OS services such as Logging, backup, file notify, database (DB), activity manager, system policy, AudioD (Audio Daemon), update, media server and the like, TV services such as EPG (Electronic Program Guide), PVR (Personal Video Recorder), data broadcasting and the like, CP services such as voice recognition, Now on, Notification, search, ACR (Auto Content Recognition), CBOX (Contents List Browser), wfdd, DMR, Remote Application, download, SDPIF (Sony Philips Digital Interface Format) and the like, native applications such as PDK applications, browser, QML application and the like, and Enyo Framework based UI related TV applications and Web applications are processed through the Web OS core module like the aforementioned SAM, WAM and LSM via Luna-Service-Bus. Meanwhile, in the above description, it is not mandatory for the TV applications and the Web applications to be Enyo-Framework-based or UI-related.

CBOX can manage a list and metadata for contents of such an external device connected to TV as USB, DLNA, Cloud and the like. Meanwhile, the CBOX can output a content listing of various content containers such as USB, DMS, DVR, Cloud and the like in form of an integrated view. And, the CBOX shows a content listing of various types such as picture, music, video and the like and is able to manage the corresponding metadata. Besides, the CBOX can output a content of an attached storage by real time. For instance, if a storage device such as USB is plugged in, the CBOX should be able to output a content list of the corresponding storage device. In doing so, a standardized method for the content list processing may be defined. And, the CBOX may accommodate various connecting protocols.

SAM is provided to enhance improvement and extensibility of module complexity. Namely, for instance, since an existing system manager handles various functions (e.g., system UI, window management, web application run time, constraint condition processing on UX, etc.) by a single process, implementation complexity is very high. Hence, by separating major functions and clarifying an inter-function interface, implementation complexity can be lowered.

LSM supports system UX implementation (e.g., card view, launcher, etc.) to be independently developed and integrated and also supports the system UX implementation to easily cope with a product requirement change and the like. In case of synthesizing a plurality of application screens like App On App, the LSM enables multitasking by utilizing hardware (HW) resource to the maximum, and is able to provide a window management mechanism for multi-window, 21:9 and the like.

LSM supports implementation of system UI based on QML and enhances development productivity thereof. QML UX can easily configure a screen layout and a UI component view and facilitates development of a code for processing a user input. Meanwhile, an interface between QML and Web OS component is achieved through QML extensive plug-in, and a graphic operation of application may be based on wayland protocol, luna-service call and the like.

LSM is an abbreviation of Luna Surface Manager, as described above, and performs a function of an application window compositor.

LSM synthesizes an independently developed application, a US component and the like and then outputs the synthesized one to a screen. With respect to this, if components such as Recents application, showcase application, launcher application and the like render contents of their own, respectively, LSM defines an output region, an inter-operating method and the like as a compositor. So to speak, the LSM (i.e., compositor) processes graphic synthesis, focus management, input event and the like. In doing so, LSM receives an event, a focus and the like from an input manager. Such an input manager may include a remote controller, an HID (e.g., mouse & keyboard), a joy stick, a game pad, an application remote, a pen touch and the like.

Thus, LSM supports a multiple window model and can be simultaneously run on all applications owing to system UI features. With respect to this, LSM can support launcher, recents, setting, notification, system keyboard, volume UI, search, finger gesture, Voice Recognition (STT (Sound to Text), TTS (Text to Sound), NLP (Natural Language Processing), etc.), pattern gesture (camera, MRCU (Mobile Radio Control Unit)), Live menu, ACR (Auto Content Recognition), and the like.

Figure 9:
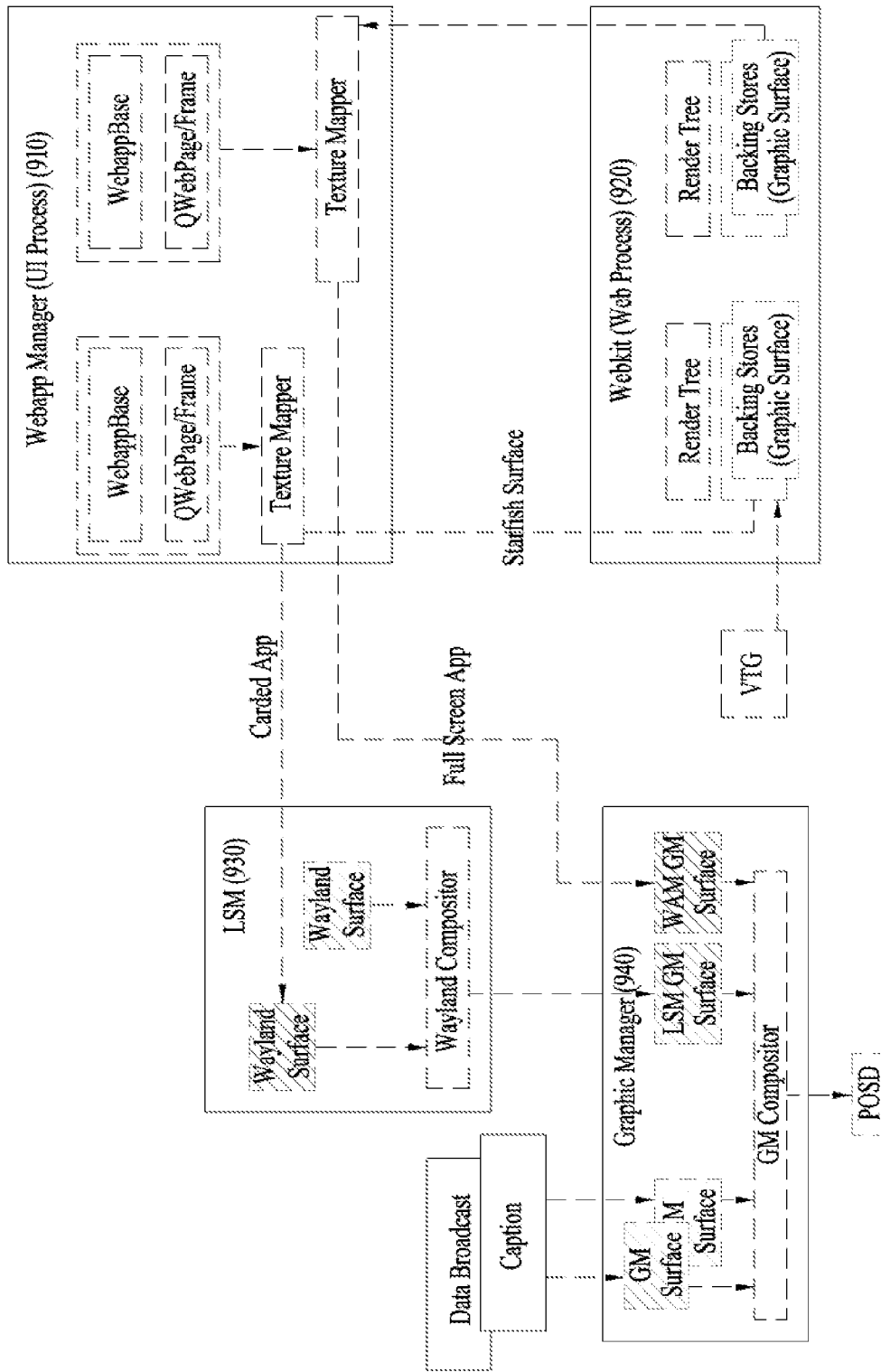
FIG. 9 is a view illustrating a graphic composition flow in a web OS device according to one embodiment of the present disclosure.

FIG. 9 is a diagram showing a graphic composition flow in a Web OS device according to one embodiment of the present invention.

Referring to FIG. 9, a graphic composition processing can be performed through a web application manager 910 in charge of a UI process, a webkit 920 in charge of a web process, an LSM 930, and a graphic manager (GM) 940.

If a web application based graphic data (or application) is generated as a UI process from the web application manager 910, the generated graphic data is forwarded to a full-screen application or the LSM 930. Meanwhile, the web application manager 910 receives an application generated from the webkit 920 for sharing the GPU (graphic processing unit) memory for the graphic managing between the UI process and the web process and then forwards it to the LSM 930 if the application is not the full-screen application. If the application is the full-screen application, it can bypass the LSM 930. In this case, it may be directly forwarded to the graphic manager 940.

The LSM 930 sends the received UI application to a wayland compositor via a wayland surface. The wayland compositor appropriately processes it and then forwards it to the graphic manager. Thus, the graphic data forwarded by the LSM 930 is forwarded to the graphic manager compositor via the LSM GM surface of the graphic manager 940 for example.

Meanwhile, as described above, the full-screen application is directly forwarded to the graphic manager 940 without passing through the LSM 930. Such an application is processed by the graphic manager compositor via the WAM GM surface.

The graphic manager processes all graphic data within the Web OS device. The graphic manager receives all the graphic data through the GM surface like data broadcasting application, caption application and the like as well as the data through the LSM GM and the data through the WAM GM surface and then processes them to be outputted to the screen appropriately. Herein, a function of the GM compositor is equal or similar to that of the aforementioned compositor.

Figure 10:
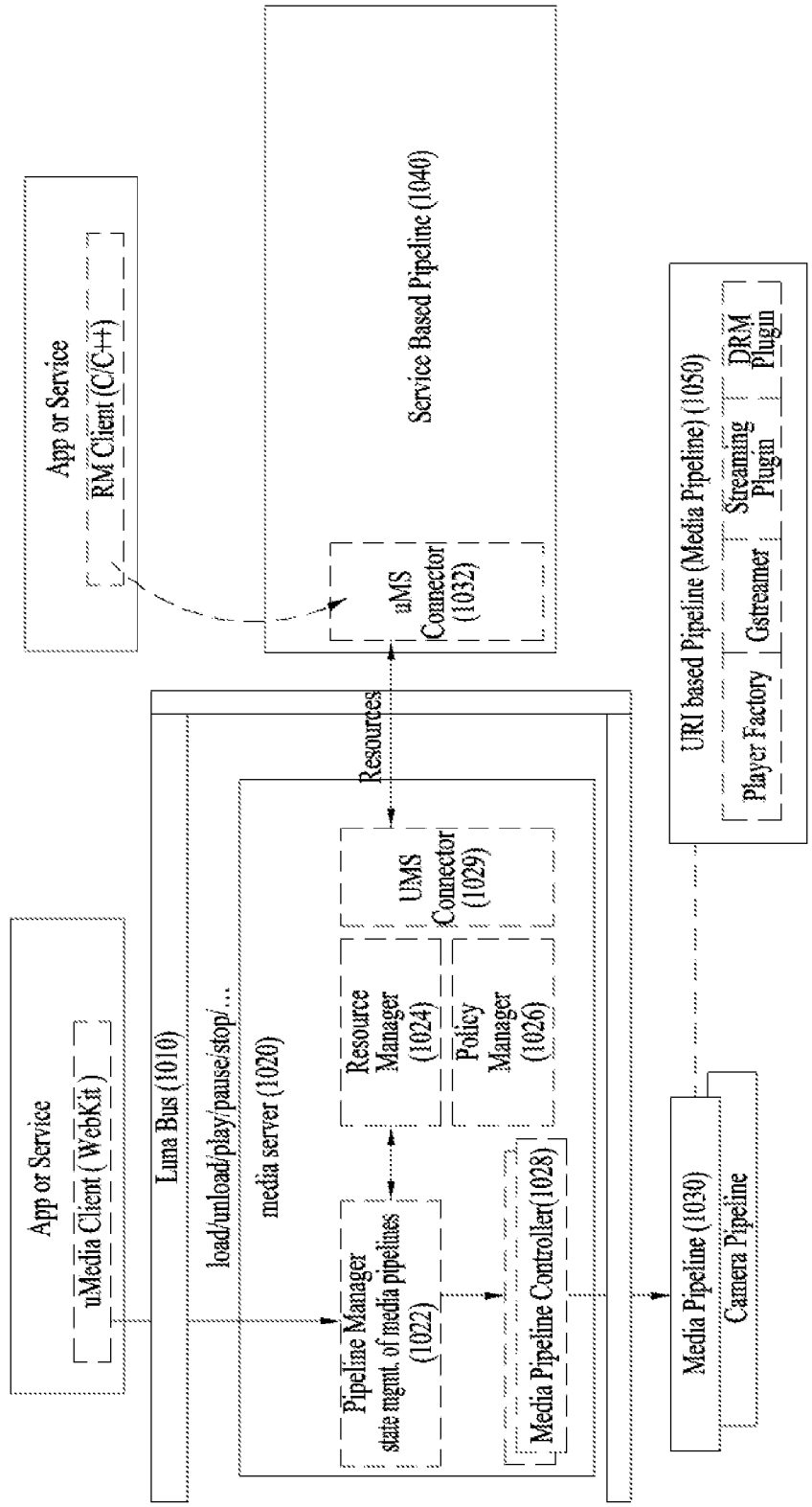
FIG. 10 is a view illustrating a media server according to one embodiment of the present disclosure.
Figure 11:
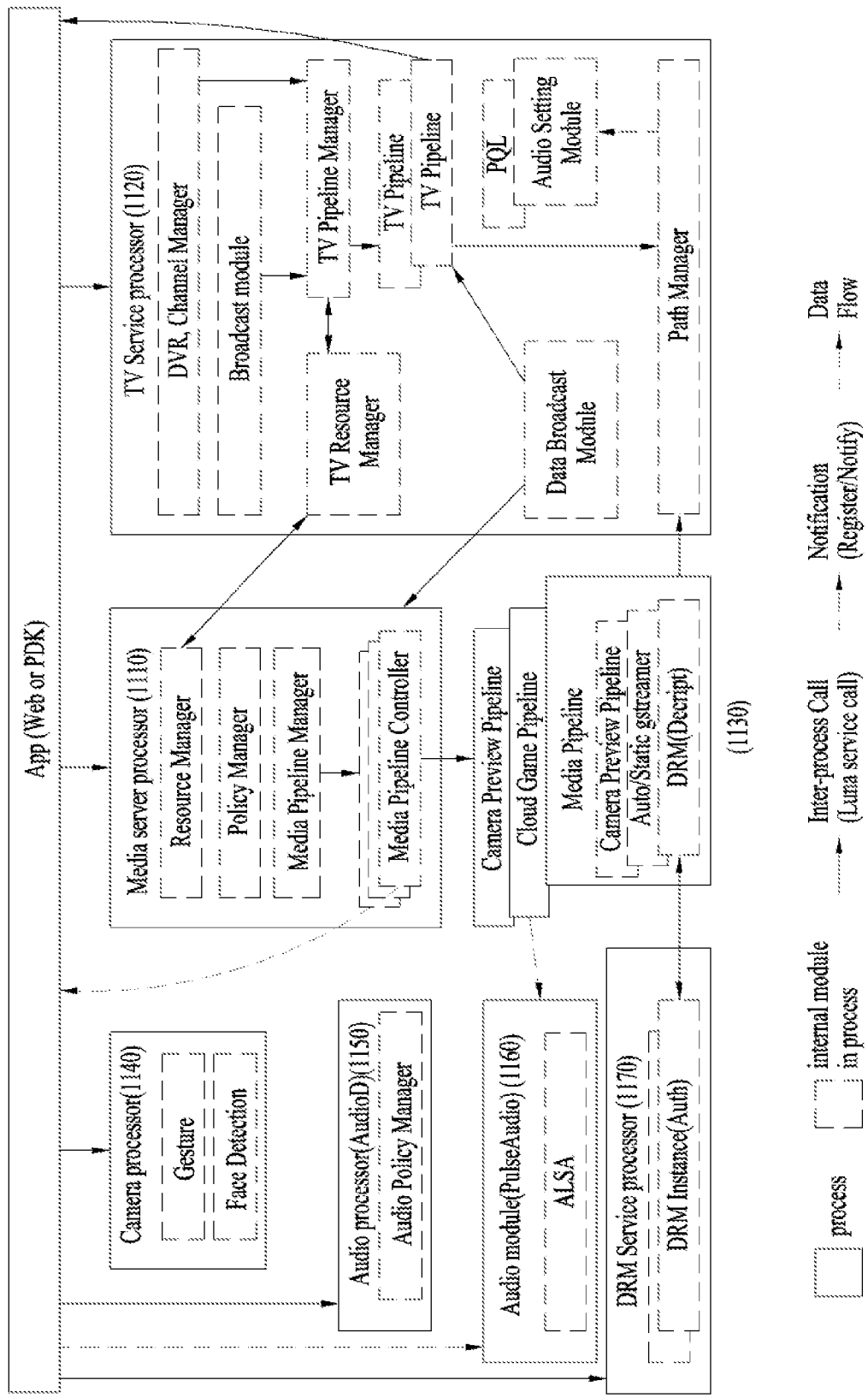
FIG. 11 is a schematic block diagram illustrating a media server according to one embodiment of the present disclosure.
Figure 12:
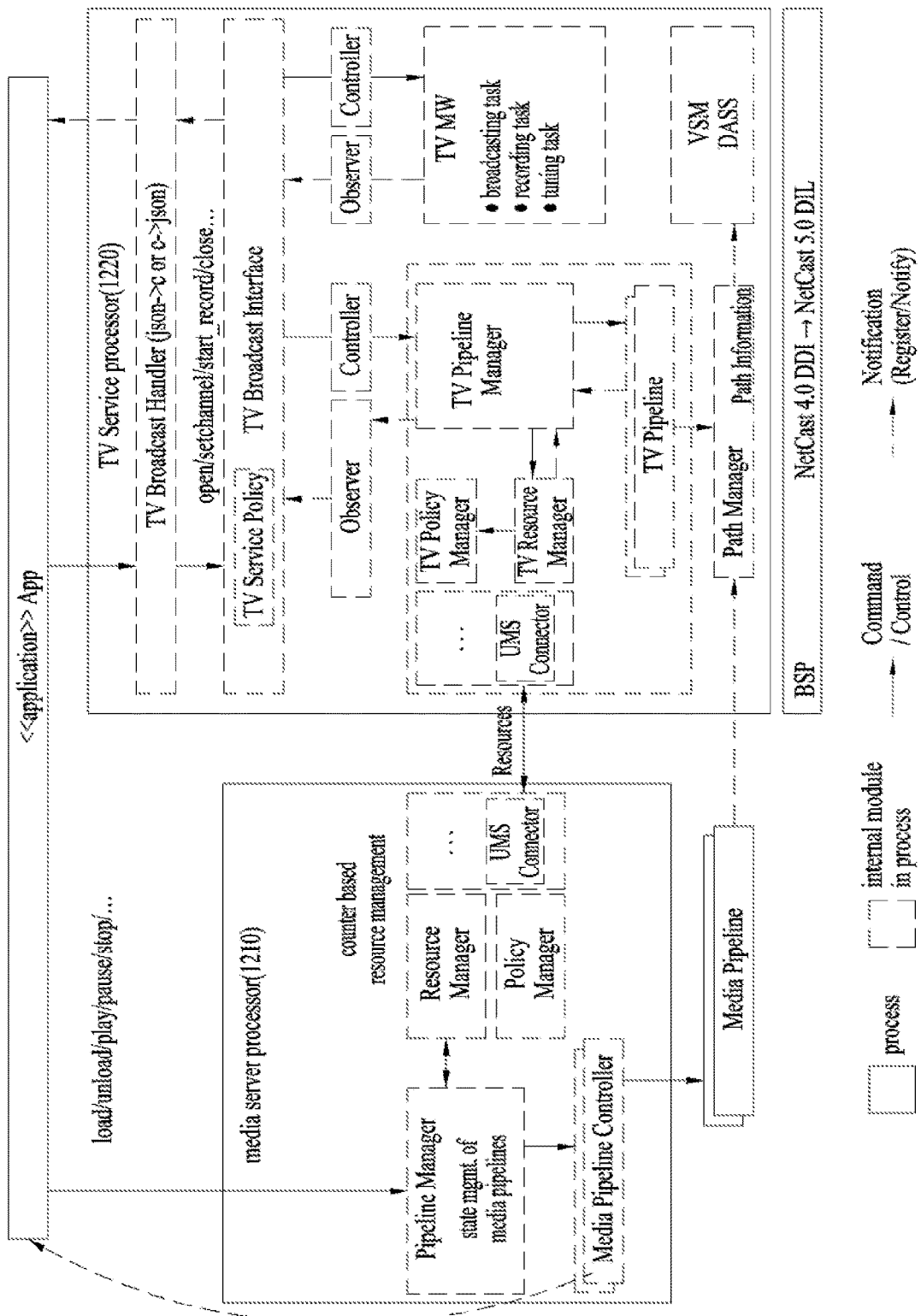
FIG. 12 is a view illustrating a relation between a media server and a TV service according to one embodiment of the present disclosure.

FIG. 10 is a diagram showing a media server according to one embodiment of the present invention. FIG. 11 is a block diagram showing a configuration of a media server according to one embodiment of the present invention. FIG. 12 is a diagram showing the relation between a media server and according to one embodiment of the present invention and a TV service.

A media server supports executions of various multimedia in a digital device and manages necessary resources. The media server can efficiently use a hardware resource required for a media play. For instance, the media server needs audio/video hardware resource to execute multimedia, and is able to efficiently utilize the resource by managing a current resource use status. Generally, a stationary (or standing) device having a screen larger than that of a mobile device requires more hardware resources on multimedia execution and needs a faster encoding/decoding and graphic data transfer speed due to a massive data size. Meanwhile, the media server should be able to handle a broadcasting/recording/tuning task, a task of recording at the same time of viewing, a task of displaying both a sender screen and a receiver screen during a video call, and the like as well as a streaming and a file based play. Yet, since hardware resources such as an encoder, a decoder, a tuner, a display engine, and the like are limited by chipset units, it is difficult for the media server to execute several tasks at the same time. Hence, the media server handles the tasks in a manner of restricting a use scenario or receiving an input of user selection.

The media server can add robustness to system stability. For instance, by removing an erroneous play pipeline per pipeline in the course of a media play and then re-maneuvering the media play, another media play is not affected even if such an error occurs. Such a pipeline is a chain of connecting the respective unit functions (e.g., decoding, analysis, output, etc.) in case of a media play request, and necessary unit functions may be changed according to a media type and the like.

The media server may have extensibility. For instance, the media server can add a pipeline of a new type without affecting an existing implementation scheme. For instance, the media server can accommodate a camera pipeline, a video conference (Skype) pipeline, a third-party pipeline and the like.

The media server can handle a general media play and a TV task execution as separate services, respectively. The reason for this is that an interface of a TV service is different from a media play case. In the above description, the media server supports operations of 'setchannel', 'channelup', 'channeldown', 'channeltuning', 'recordstart' and the like in association with the TV service but supports operations of 'play', 'pause', 'stop' and the like in association with the general media play, thereby supporting different operations for the two services, respectively. Thus, the media server is able to handle the services separately.

The media server may control or manage resource management functions integratedly. Hardware resource allocation, recovery and the like in a device are integratedly performed in the media server. Particularly, a TV service process delivers a currently running task, a current resource allocation status and the like to the media server. Each time each media is executed, the media server secures a resource, activates a pipeline, and performs a grant of execution by a priority (e.g., policy), a resource recovery of other pipelines and the like in response to a media execution request based on a current resource status occupied by each pipeline. Herein, a predefined execution priority and a necessary resource information for a specific request are managed by a policy manager, and a resource manager can handle resource allocation, recovery and the like by communicating with the policy manager.

The media server can retain an ID (identifier) for every operation related to a play. For instance, based on an identifier, the media server can give a command by indicating a specific pipeline. For two or more media plays, the media server may give a command to pipelines by distinguishing the two from each other.

The media server may be in charge of a play of HTMS 5 standard media.

Besides, the media server may follow a TV reconfiguration range for a separate service processing of a TV pipeline. The media server can be designed irrespective of the TV reconfiguration range. If the TV is not separately service-processed, when a problem arises from a specific task, the TV may be re-executed entirely.

The media server is so-called uMS, i.e., a micro media server. Herein, a media player is a media client. This may mean a webkit for HTML 5 video tag, camera, TV, Skype, $2^{nd}$ screen and the like.

A core function of the media server is the management of a micro resource such as a resource manager, a policy manager or the like. With respect to this, the media server controls a playback control role on a web standard media content. Regarding this, the media server may manage a pipeline controller resource.

Such a media server supports extensibility, reliability, efficient resource usage and the like for example.

So to speak, the uMS, i.e., the media server manages and controls the use of resources for an appropriate processing in a Web OS device such as a resource (e.g., cloud game, MVPD (pay service, etc.), camera preview, 2nd screen, Skype, etc.), a TV resource and the like overall, thereby functioning in managing and controlling an efficient usage. Meanwhile, when resources are used, each resource uses a pipeline for example. And, the media server can manage and control generation, deletion, usage and the like of the pipeline for resource management overall.

Herein, a pipeline may be generated if a media related to a task starts to continue a job such as a parsing of request, decoding stream, video output, or the like. For instance, in association with a TV service or application, watching, recording, channel tuning or the like is individually processed in a manner that a resource usage or the like is controlled through a pipeline generated in response to a corresponding request.

A processing structure of a media server and the like are described in detail with reference to FIG. 10 as follows.

In FIG. 10, an application or service is connected to a media server 1020 through a luna-service bus 1010. The media server 1020 is connected to generated pipelines through the luna-service bus 1010 again and manages them.

The application or service is provided with various clients according to its property and is able to exchange data with the media server 1020 or the pipelines through them.

The clients may include a uMedia client (webkit) for the connection to the media server 1020, an RM (resource manager) client (C/C++) and the like for example.

The application including the uMedia client, as described above, is connected to the media server 1020. In particular, the uMedia client corresponds to a video object to be described later. Such a client uses the media server 1020 for an operation of a video in response to a request or the like.

Herein, the video operation relates to a video status. Loading, unloading, play (or, playback, reproduce), pause, stop and the like may include all status data related to video operations. Each operation or status of a video can be processed through individual pipeline generation. Hence, the uMedia client sends status data related to the video operation to the pipeline manager 1022 in the media server.

The pipeline manager 1022 obtains information on a current resource of a device through data communication with the resource manager 1024 and makes a request for allocation of a resource corresponding to the status data of the uMedia client. In doing so, the pipeline manager 1022 or the resource manager 1024 controls the resource allocation through the data communication with the policy manager 1026 if necessary in association with the resource allocation and the like. For instance, if a resource to be allocated by the resource manager in response to the request made by the pipeline manager 1022 does not exist or is insufficient, an appropriate resource allocation or the like according to the request can be performed according to priority comparison of the policy manager 1026 and the like.

Meanwhile, the pipeline manager 1022 makes a request for pipeline generation for an operation according to the uMedia client's request for the resource allocated according to the resource allocation of the resource manager 1024 to a media pipeline controller 1028.

The media pipeline controller 1028 generates a necessary pipeline under the control of the pipeline manager 1022. Regarding the generated pipelines, as shown in the drawing, pipelines related to play, pause, stop and the like can be generated as well as a media pipeline and a camera pipeline. Meanwhile, the pipelines may include pipelines for HTML5, Web CP, smartshare play, thumbnail extraction, NDK, cinema, MHEG (Multimedia and Hypermedia Information coding Experts Group) and the like.

Besides, pipelines may include a service based pipeline (self-pipeline) and a URI based pipeline (media pipeline) for example.

Referring to FIG. 10, the application or service including the RM client may not be directly connected to the media server 1020. The reason for this is that the application or service may directly process a media. So to speak, in case that the application or service directly processes media, the media server can be bypassed. Yet, in doing so, since resource management is necessary for the pipeline generation and usage, a uMS connector functions for it. Meanwhile, if a resource management request for the direct media processing of the application or service is received, the uMS connector communicates with the media server 1020 including the resource manager 1024. To this end, the media server 1020 should be provided with a uMS connector as well.

Hence, by receiving the resource management of the resource manager 1024 through the uMS connector, the application or service can cope with the request of the RM client. Such an RM client may process services such as native CP, TV service, $2^{nd}$ screen, flash player, U-tube MSE (media source extensions), cloud game, Skype and the like. In this case, as described above, the resource manager 1024 can manage resource through appropriate data communication with the policy manager 1026 if necessary for the resource management.

Meanwhile, the URI based pipeline is processed through the media server 1020 instead of the case of directly processing media like the RM client. The URI based pipelines may include player factory, Gstreamer, streaming plug-in, DRM (Digital Rights Management) plug-in pipeline and the like.

A method of interfacing between an application and media services is described as follows.

There is an interfacing method using a service on a web application. This may be a Luna Call method using PSB (palm service bridge) or a method using Cordova. This is to extend a display with a video tag. Besides, there may be a method of using HTMS5 standard for video tag or media element.

And, there is a method of interfacing using a service in PDK.

Alternatively, there is a method of using a service in an existing CP. This is usable by extending plug-in of an existing platform on the basis of luna for backward compatibility.

Finally, there is an interfacing method in case of non-Web OS. In this case, it is able to interface by directly calling a luna bus.

Seamless change is processed by a separate module (e.g., TVWIN), which is a process for showing a TV on a screen preferentially without Web OS and then processing seamlessly before or during Web OS booting. Since a booting time of Web OS is considerably long, it is used to provide basic functions of a TV service preferentially for a quick response to a user's power-on request. And, the module is a part of a TV service process and supports a seamless change capable of providing fast booting and basic TV functions, a factory mode and the like. And, the module may be in charge of a switching from non-Web OS mode to Web OS mode.

Referring to FIG. 11, a processing structure of a media server is illustrated.

In FIG. 11, a solid line box may indicate a process handling configuration and a dotted line box may indicate an internal processing module in a process. A solid line arrow may include an inter-process call, i.e., a luna service call and a dotted line arrow may indicate a notification of register/notify or a data flow.

A service, a web application or a PDK application (hereinafter 'application) is connected to various service processing configurations through a luna-service bus. Through it, the application operates or an operation of the application is controlled.

A corresponding data processing path is changed according to a type of an application. For instance, if the application is an image data related to a camera sensor, it is processed by being sent to a camera processor 1130. Herein, the camera processor 1130 includes a gesture module, a face detection module and the like and processes image data of the application received. Herein, in case of data requiring a usage of a pipeline and the like automatically or according to a user's selection, the camera processor 1130 may process the corresponding data by generating the pipeline through a media server processor 1110.

Alternatively, if an application includes audio data, the corresponding audio can be processed through an audio processor (AudioD) 1140 and an audio module (PulseAudio) 1150. For instance, the audio processor 1140 processes audio data received from the application and then sends it to an audio module 1150. In doing so, the audio processor 1140 may determine the processing of the audio data by including an audio policy manager. The processed audio data is processed and handled by the audio module 1150. Meanwhile, the application may notify data related to the audio data processing to the audio module 1160, which may be notified to the audio module 1160 by a related pipeline. The audio module 1150 includes ALSA (Advanced Linux Sound Architecture).

Or, in case that an application includes or processes (hereinafter 'includes') a DRM hooked content, a corresponding content data is sent to a DRM service processor 1160. The DRM service processor 1160 generates the DRM hooked content data by generating a DRM instance. Meanwhile, for the processing of the DRM hooked content data, the DRM service processor 1160 can be connected to a DRM pipeline in a media pipeline through the luna-service bus.

A processing for a case that an application includes media data or TV service data (e.g., broadcast data) is described as follows.

FIG. 12 is a diagram showing details of the media service processor and the TV service processor in FIG. 11.

The following description is made with reference to FIG. 11 and FIG. 12 both.

First of all, in case that an application includes TV service data, it is processed by the TV service processor 1120/1220.

Herein, the TV service processor 1120 may include at least one of a DVR/channel manager, a broadcast module, a TV pipeline manager, a TV resource manager, a data broadcast module, an audio setting module, a path manager and the like. Alternatively, the TV service processor 1220 in FIG. 12 may include a TV broadcast handler, a TV broadcast interface, a service processing unit, a TV middleware (MW), a path manager, and a BSP (NetCast). Herein, the service processing unit may mean a module including a TV pipeline manager, a TV resource manager, a TV policy manager, a USM connector and the like.

In the present specification, The TV service processor may be implemented into the configuration shown in FIG. 11 or FIG. 12 or a combination of both configurations. some of the illustrated components may be omitted or new components (not shown) may be further added as required.

Based on attribute or type of the TV service data received from the application, the TV service processor 1120/1220 sends DVR or channel associated data to the DVR/channel manager and also sends it to the TV pipeline manager to generate and process a TV pipeline. Meanwhile, if the attribute or type of the TV service data is a broadcast content data, the TV service processor 1120 generates and processes a TV pipeline through the TV pipeline manager to process the corresponding data through the broadcast module.

Or, a json (Javascript standard object notation) file or a file composed with c is processed by the TV broadcast handler, sent to the pipeline manager through the TV broadcast interface, and then processed by generating a TV pipeline. In this case, the TV broadcast interface sends the data or file through the TV broadcast handler to the TV pipeline manager on the basis of the TV service policy so that the data or file can be referred to for the pipeline generation.

Meanwhile, the TV pipeline manager may be controlled by the TV resource manager when generating one or more pipelines in response to a TV pipeline generation request from the Processing module or manager in the TV service. Meanwhile, in order to request a status and allocation of a resource allocated for the TV service in response to a TV pipeline generation request made by the TV pipeline manager, the TV resource manager may be controlled by the TV policy manager and performs data communication with the media server processor 1110/1210 through the uMS connector. The resource manager in the media server processor delivers a status and a presence/non-presence of allocation of a resource for a current TV service in response to a request made by the TV resource manager. For instance, as a result of confirmation of the resource manager within the media server processor 1110/1210, if all resources for the TV service are already allocated, it is able to notify the TV resource manager that all current resources are completely allocated. In doing so, the resource manager in the media server processor may request or assign TV pipeline generation for the requested TV service by removing a prescribed TV pipeline according to a priority or prescribed reference from TV pipelines previously assigned for the TV service, together with the notification. Alternatively, according to a status report of the resource manager in the media server processor 1110/1210, the TV resource manager may control TV pipelines to be appropriately removed, added, or established.

Meanwhile, BSP supports backward compatibility with an existing digital device for example.

The above-generated TV pipelines may operate appropriately in the corresponding processing process under the control of the path manager. The path manager may determine or control a processing path or process of pipelines by considering an operation of a pipeline generated by the media server processor 1110/1210 as well as the TV pipeline in the processing process.

If the application includes media data instead of TV service data, the data is processed by the media server processor 1110/1210. Herein, the media server processor 1110/1210 includes a resource manager, a policy manager, a media pipeline manager, a media pipeline controller and the like. Meanwhile, various pipelines generated under the control of the media pipeline manager and the media pipeline controller may include a camera preview pipeline, a cloud game pipeline, a media pipeline and the like. Streaming protocol, auto/static gstreamer, DRM and the like may be included in the media pipeline, of which processing flow may be determined under the control of the path manager. The former description with reference to FIG. 10 is recited for a detailed processing process in the media server processor 1110/1210, which is not described redundantly herein.

In the present specification, the resource manager in the media server processor 1110/1210 can perform a resource managing with a counter base for example.

Figure 13:
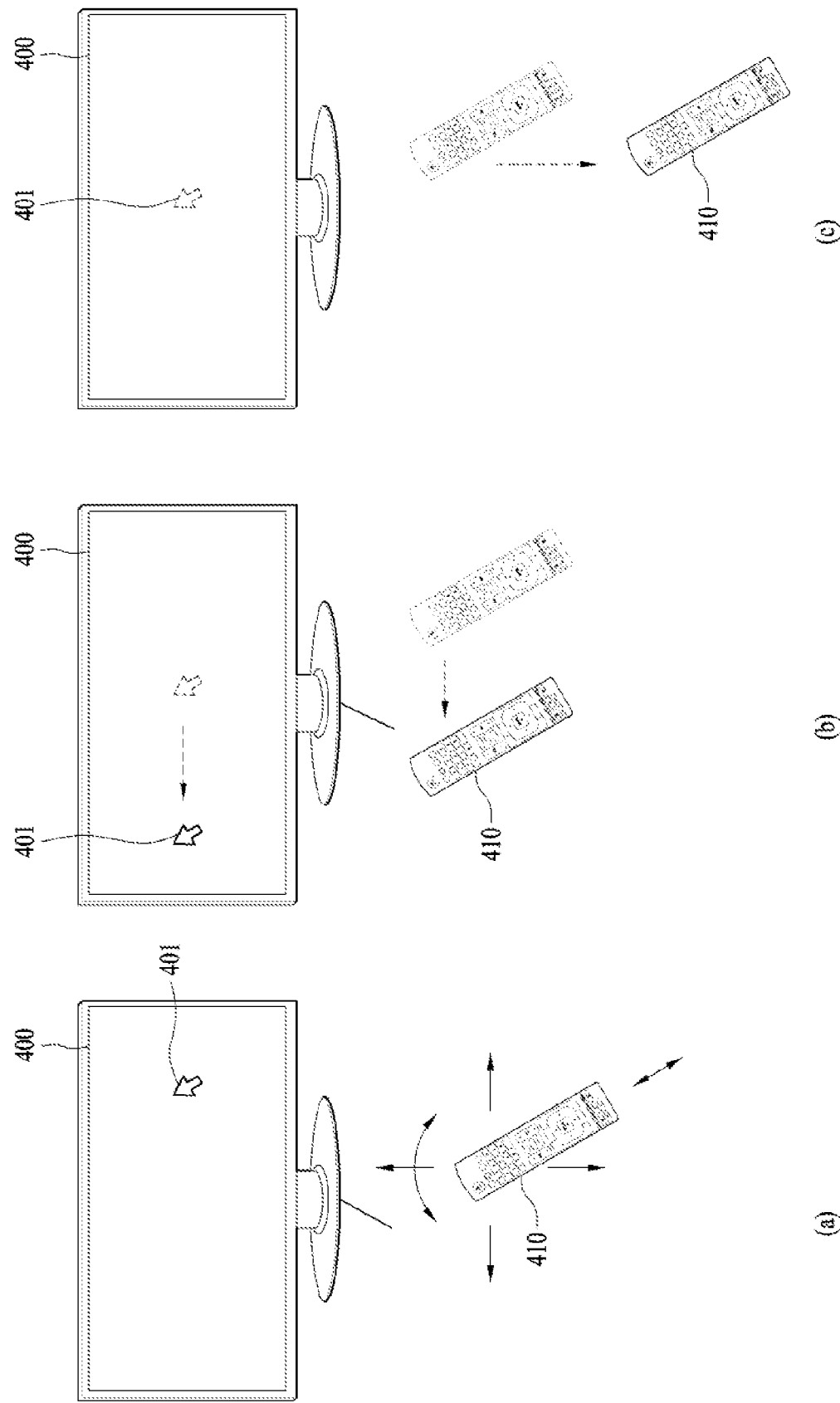
FIG. 13 is a view illustrating a method for controlling a remote controller for controlling any one of image display devices according to the embodiments of the present disclosure.

FIG. 13 is a diagram showing a method of controlling a remote controller controlling a random one of video display devices according to embodiments of the present invention.

As shown in FIG. 13 (*a*), a pointer 205 corresponding to a remote controller 200 is displayed on a display unit 180 for example.

A user can move or rotate the remote controller 200 top and bottom, right and left [FIG. 13 (*b*)] or back and forth [FIG. 13 (*c*)]. The pointer 205 displayed on the display unit 180 of the video display device corresponds to a motion of the remote controller 200. Since the corresponding pointer 205 is moved and displayed in response to a motion in 3D space, such a remote controller 200 may be named a space remote controller.

FIG. 13 (*b*) exemplarily shows that, if a user moves the remote controller 200 to the left, the pointer 205 displayed on the display unit 180 of the video display device moves to the left correspondingly.

Information on the motion of the remote controller 200 sensed through a sensor of the remote controller 200 is sent to the video display device. From the information on the motion of the remote controller 200, the video display device may calculate coordinates of the pointer 205. The video display device can display the pointer 205 to correspond to the calculated coordinates.

FIG. 13 (*c*) exemplarily shows that a user moves the remote controller 200 to get away from the display unit 180 while pressing a specific button in the remote controller 200. If so, a selected region within the display unit 180 corresponding to the pointer 205 can zoom in so as to be displayed by being enlarged. On the contrary, if a user moves the remote controller 200 to get close to the display unit 180, a selected region within the display unit 180 corresponding to the pointer 205 can zoom out so as to be displayed by being reduced. Meanwhile, if the remote controller 200 gets away from the display unit 180, the selected region may zoom out. If the remote controller 200 gets close to the display unit 180, the selected region may zoom in.

Meanwhile, while the specific button in the remote controller 200 is pressed, recognition of top-bottom and right-left motions may be excluded. Namely, if the remote controller 200 is moved to get away from or close to the display unit 180, top, bottom, right and left motions are not recognized but a back-forth motion can be set to be recognized only. While the specific button in the remote controller 200 is not pressed, only the pointer 205 moves in response to top-bottom or right-left motion of the remote controller 200.

Meanwhile, a moving speed or direction of the pointer 205 may correspond to that of the remote controller 200.

Meanwhile, a pointer in the present specification means an object displayed on the display unit 180 in response to a motion of the remote controller 200. Hence, objects in various shapes are possible using the pointer 205 as well as the arrow shape shown in the drawing. For example, the object may conceptually include one of a point, a cursor, a prompt, a thick outline and the like. And, the pointer 205 can be displayed to correspond to a plurality of points of a line, a surface or the like as well as to correspond to a point of one of a width line and a length line on the display unit 180.

Figure 14:
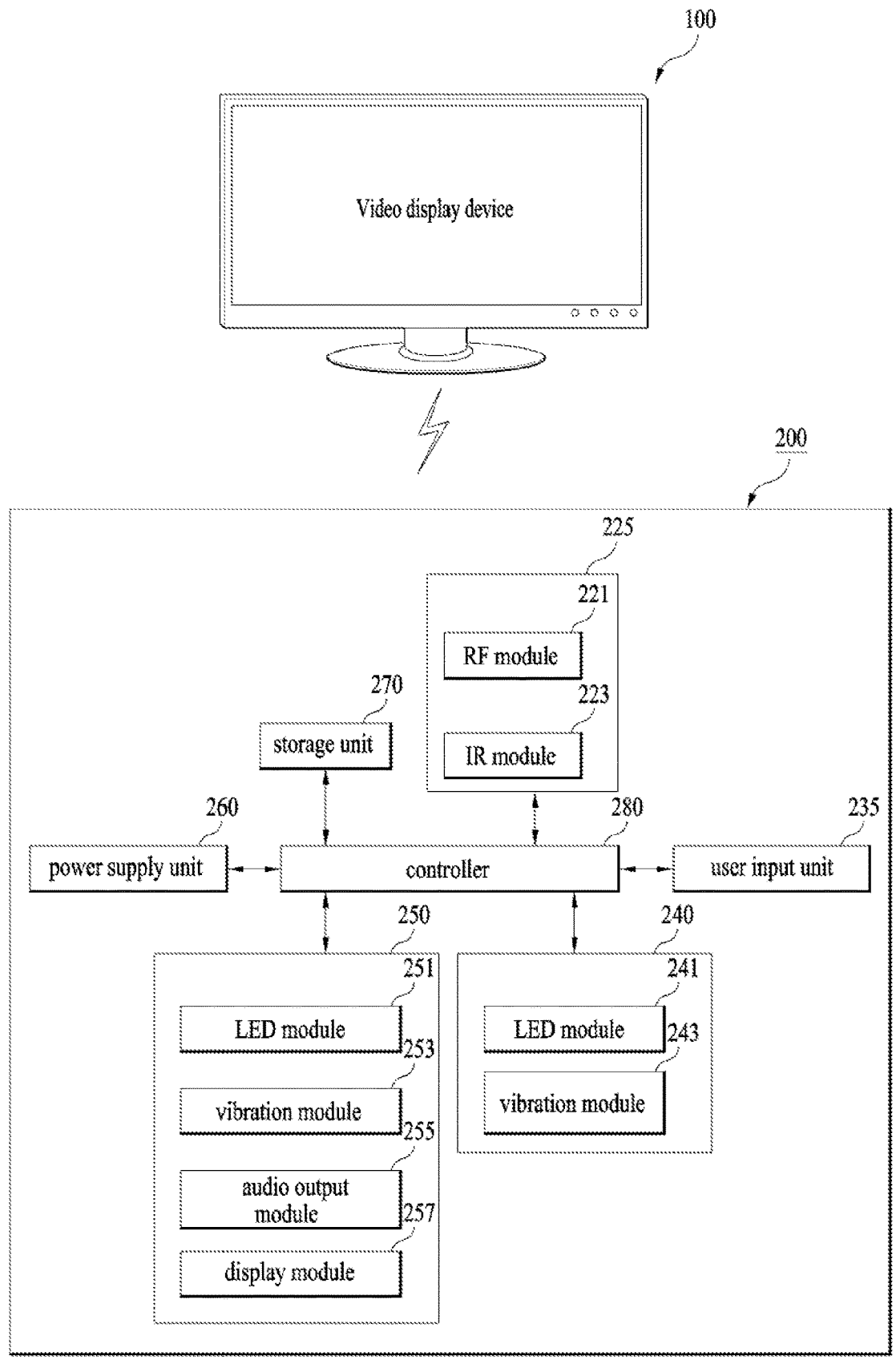
FIG. 14 is a block diagram illustrating the inside of a remote controller for controlling any one of image display devices according to the embodiments of the present disclosure.

FIG. 14 is an internal block diagram of a remote controller controlling a random one of video display devices according to embodiments of the present invention.

Referring to FIG. 14, a remote controller 200 may include a wireless communication unit 225, a user input unit 235, a sensor unit 240, an output unit 250, a power supply unit 260, a storage unit 270, and a controller 280.

The wireless communication unit 225 transceives signals with a random one of video display devices according to the aforementioned embodiments of the present invention. Among the video display devices according to the embodiments of the present invention, a prescribed video display device 100 shall be described for example.

In the present embodiment, the remote controller 200 may include an RF module 221 capable of transceiving signals with the video display device 100 by the RF communication standards. And, the remote controller 200 may include an IR module 223 capable of transceiving signals with the video display device 100 by the IR communication standards.

In the present embodiment, the remote controller 200 transmits a signal containing information on a motion of the remote controller 200 and the like to the video display device 100 through the RF module 221.

And, the remote controller 200 may receive a signal transmitted by the video display device 100 through the RF module 221. Moreover, the remote controller 200 can send commands for power ON/OFF, channel switching, volume change and the like to the video display device 100 through the IR module 223 if necessary.

The user input unit 235 may include a keypad, a button, a touchpad, a touchscreen or the like. A user manipulates the user input unit 235, thereby inputting a command related to the video display device 100 to the remote controller 200. In case that the user input unit 235 includes a hard key button, a user can input a command related to the video display device 100 to the remote controller 200 through an action of pushing the hard key button. In case that the user input unit 235 includes a touchscreen, a user touches a soft key of the touchscreen, thereby inputting a command related to the video display device 100 to the remote controller 200. The user input unit 235 may include input means (e.g., a scroll key, a jog key, etc.) of various types that can be manipulated by a user, by which the scope of the appended claims and their equivalents is non-limited.

The sensor unit 240 may include a gyro sensor 241 or an acceleration sensor 243.

The gyro sensor 241 can sense information on a motion of the remote controller 200.

For example, the gyro sensor 241 can sense information on an operation of the remote controller 200 with reference to x-, y- and z-axes. The acceleration sensor 243 can sense information on a moving speed of the remote controller 200 and the like. Meanwhile, a distance measurement sensor may be further included, by which a distance from the display unit 180 can be sensed.

The output unit 250 can output a video or audio signal corresponding to a manipulation of the user input unit 235 or a signal transmitted by the video display device 100. Through the output unit 250, a user can whether the user input unit 235 is manipulated, or whether the video display device 100 is controlled.

For example, the output unit 250 may include an LED module 251 configured to turn on light, a vibration module 253 configured to generate vibration, an audio output module 255 configured to output audio, or a display module 257 configured to output video, if the user input unit 235 is manipulated or a signal is transceived with the video display device 100 through the wireless communication unit 225.

The power supply unit 260 supplies power to the remote controller 200. If the remote controller 200 fails to move during a prescribed time, the power supply unit 260 stops supplying the power, thereby reducing the waste of power consumption. If a prescribed key provided to the remote controller 200 is manipulated, the power supply unit 260 can resume the power supply.

The storage unit 270 can store various kinds of programs, applications, data and the like necessary for the control or operation of the remote controller 200. If the remote controller 200 transceives signals with the video display device 100 through the RF module 221 by wireless, the remote controller 200 and the video display device 100 transceive signals on a prescribed frequency band. The controller 280 of the remote controller 200 saves information on a frequency band capable of transceiving signals with the video display device 100 paired with the remote controller 200 by wireless to the storage unit 270 and is then able to refer to the saved information.

The controller 280 controls various matters or issues related to the control of the remote controller 200. The controller 280 can transmit a signal corresponding to a manipulation of a prescribed key of the user input unit 235 or a signal corresponding to a motion of the remote controller 200 sensed by the sensor unit 240 to the video display device 100 through the wireless communication unit 225.

Figure 15:
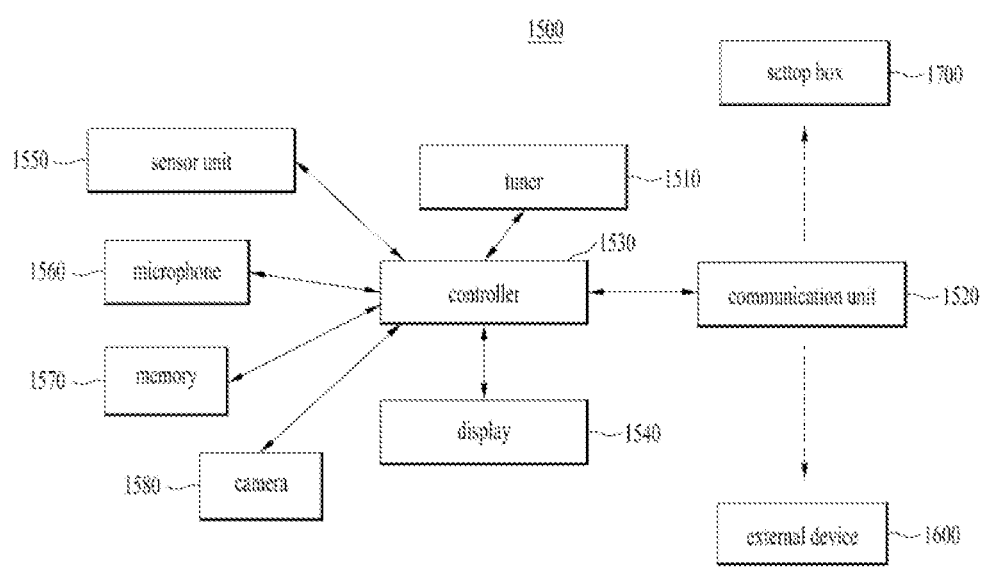
FIG. 15 is a configuration diagram of a display device according to one embodiment of the present disclosure.

FIG. 15 is a configuration diagram of a display device according to one embodiment of the present disclosure.

Referring to FIG. 15, a display device 1500 includes a tuner 1510, a communication unit 1520, a controller 1530, a display 1540, a sensor unit 1550, a microphone 1560, a memory 1570, and a camera 1580. The display device 1500 is connected to a settop box 1700 over communication.

The tuner 1510 receives a broadcast signal from a broadcast station.

The communication unit 1520 performs communication with an external device 1600 and the settop box 1700. The settop box 1700 receives a content from an external server. The external device 1600 includes an external remote controller.

The controller 1530 controls at least one of the tuner, the communication unit, the sensor unit and the display.

The controller 1530 controls the display 1540 to display the content.

If a brightness of a fixed region, which is sensed by the sensor unit and means a region having a brightness maintained over a prescribed brightness in a whole display region, is maintained over a first prescribed time, the controller 1530 controls the display 1540 to decrease a brightness into a first brightness value from a default brightness value for a first brightness decrease time.

If the settop box 1700 receives a first signal of changing a screen from a first screen to a second screen from the external device 1600 within a second prescribed time, the controller 1530 controls the display 1540 to increase a brightness to the default brightness value from the first brightness value.

While the settop box 1700 does not receive the first signal from the external device 1600, if the brightness of the fixed region sensed by the sensor unit is maintained over a second prescribed time, the controller 1530 controls the display 1540 to decrease the brightness to a second brightness from the first brightness during a second brightness decrease time.

The display 1540 displays a content included in a received broadcast signal on the screen. Here, the content is received from the settop box 1700 or stored in the memory 1570.

The sensor unit 1550 senses a brightness of the display 1540 according to a control command of the controller 1530.

The microphone 1560 receives user's voice from a user.

The memory 1570 stores setting information of the display device 1500.

The camera 1580 captures a front image of the display device 1500 according to a control command of the controller 1530.

Figure 16:
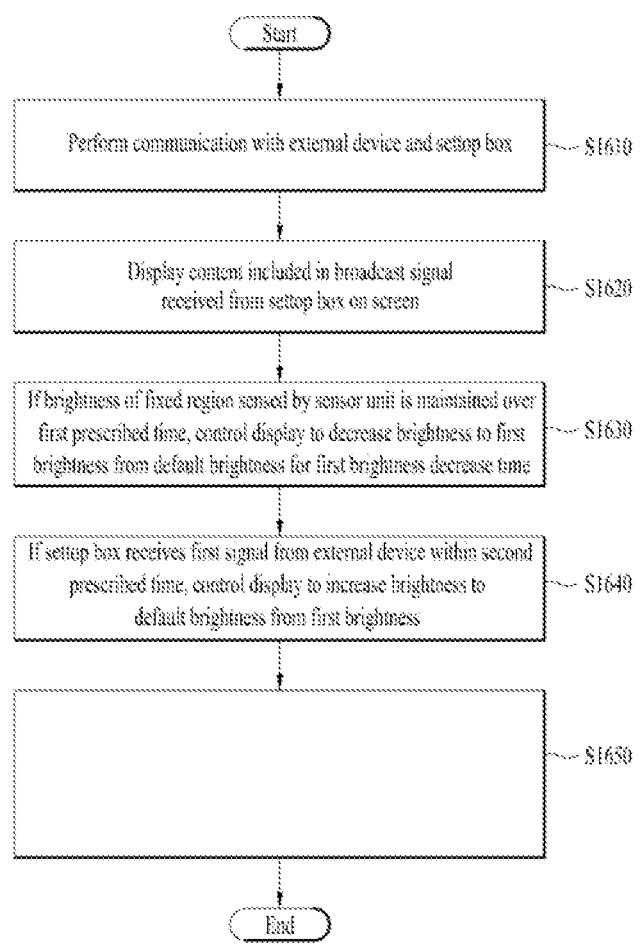
FIG. 16 is a diagram showing a method of controlling a display device according to one embodiment of the present disclosure.

FIG. 16 is a diagram showing a method of controlling a display device according to one embodiment of the present disclosure. The present disclosure is performed by the controller 1530.

First of all, communication with the external device and the settop box 1700 is performed [S1610].

The display 1540 displays a content included in a broadcast signal received from the settop box 1700 on the screen [S1620].

If a brightness of a fixed region, which is sensed by the sensor unit 1550 and means a region having a brightness maintained over a prescribed brightness in a whole display region, is maintained over a first prescribed time, the controller 1530 controls the display 1540 to decrease a brightness to a first brightness from a default brightness for a first brightness decrease time [S1630].

If the settop box 1700 receives a first signal of changing a screen from a first screen to a second screen from the external device 1600 within a second prescribed time, the controller 1530 controls the display 1540 to increase a brightness to the default brightness from the first brightness [S1640].

While the settop box 1700 does not receive the first signal from the external device 1600, if the brightness of the fixed region sensed by the sensor unit 1550 is maintained over a second prescribed time, the controller 1530 controls the display 1540 to decrease the brightness to a second brightness from the first brightness during a second brightness decrease time [S1650].

FIG. 17 is a diagram showing that an afterimage is generated if a fixed region is neglected for a long time, according to one embodiment of the present disclosure. FIG. 17 includes FIG. 17 (*a*) and FIG. 17 (*b*).

FIG. 17 (*a*) is a diagram showing a settop box menu screen. Referring to FIG. 17 (*a*), since degradation of a display panel occurs in fixed regions 1710 and 1720 of the settop box menu screen, it is highly possible that an afterimage may be generated. Each of the fixed regions 1710 and 1720 means the region having high possibility of afterimage generation because a specific region in a whole region is displayed continuously.

FIG. 17 (*b*) is a diagram showing a settop box menu screen. Referring to FIG. 17 (*b*), as degradation of a display panel occurs in fixed regions 1730 and 1740 in the settop box menu screen, it is highly possible that an afterimage may be generated.

FIG. 18 is a diagram showing that an afterimage is generated if a fixed region is neglected for a long time, according to one embodiment of the present disclosure. FIG. 18 includes FIG. 18 (a) and FIG. 18 (b).

FIG. 18 (a) is a diagram showing a settop box menu screen. Referring to FIG. 18 (a), since degradation of a display panel occurs in a fixed region 1810 of the settop box menu screen, it is highly possible that an afterimage may be generated. In addition, since a screen changes not on the settop box menu screen but in a live TV screen 1820 according to a time, the possibility of afterimage generation is low.

FIG. 18 (b) is a diagram showing a settop box menu screen. Referring to FIG. 18 (b), as degradation of a display panel occurs in fixed regions 1830 and 1840 in the settop box menu screen, it is highly possible that an afterimage may be generated.

FIG. 19 is a diagram showing that if a settop box receives a first signal from a remote controller, a screen is switched from a settop box menu screen to a live screen, according to one embodiment of the present disclosure. FIG. 19 includes FIG. 19 (a) and FIG. 19 (b).

FIG. 19 (a) is a diagram showing a settop box menu screen. FIG. 19 (b) is a diagram showing a live screen.

First of all, a first screen and a second screen are defined.

As shown in FIG. 19 (a), a first screen includes a settop box menu screen. As shown in FIG. 19 (b), a second screen includes a live screen.

Here, a first signal means a signal of changing a screen into the second screen from the first screen. The first signal may include an OSD exit key.

The sensor unit 1540 senses fixed regions 1910 and 1920. Since each of the fixed regions 1910 and 1920 continuously displays a specific region in a whole region, it is the region having high possibility of afterimage generation.

If the settop box 1700 receives the first signal from the external remote controller 1600 within a first decrease time, the controller 1530 of the display device 1500 returns a brightness of the display 1540 to a default value.

According to the present disclosure, as a screen is changed into a live screen from a settop box menu screen, a fixed region disappears, thereby preventing afterimage generation.

Figure 20:
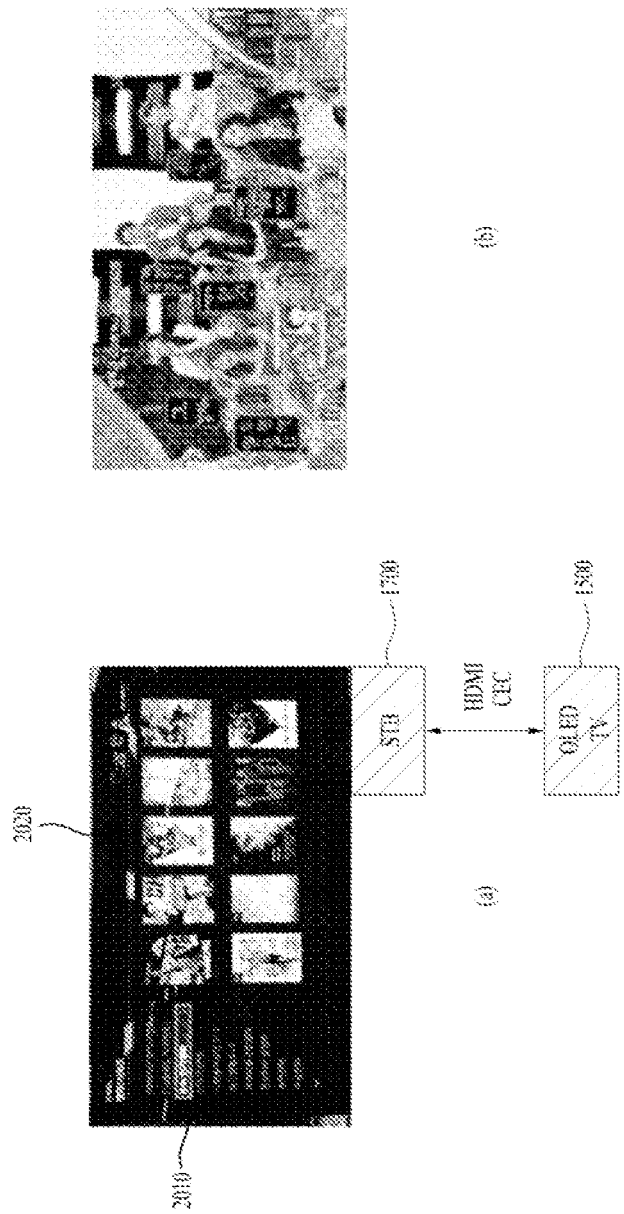
FIG. 20 is a diagram showing that if a display device transmits a first signal to a settop box, a screen is switched from a settop box menu screen to a live screen, according to one embodiment of the present disclosure.

FIG. 20 is a diagram showing that if a display device transmits a first signal to a settop box, a screen is switched from a settop box menu screen to a live screen, according to one embodiment of the present disclosure. FIG. 20 includes FIG. 20 (a) and FIG. 20 (b).

FIG. 20 (a) is a diagram showing a settop box menu screen. FIG. 20 (b) is a diagram showing a live screen.

As shown in FIG. 20 (a), a first screen includes a settop box menu screen. As shown in FIG. 20 (b), a second screen includes a live screen.

Here, a first signal means a signal of changing a screen into the second screen from the first screen. The first signal may include an OSD exit key.

The sensor unit 1540 senses fixed regions 2010 and 2020. Since each of the fixed regions 2010 and 2020 continuously displays a specific region in a whole region, it is the region having high possibility of afterimage generation.

An embodiment for the display device 1500 to transmit a first signal to a settop box will be described. The display device 1500 may include an OLED TV.

As shown in FIG. 19, if the settop box 1700 does not receive a first signal from the external device 1600 within a second prescribed time, the controller 1530 of the display device 1500 controls the communication unit 1520 to transmit the first signal to the settop box 1700.

For example, the controller 1530 may control the communication unit 1520 to transmit the first signal to the settop box 1700 by HDMI-CEC communication.

HDMI-CEC is the abbreviation of High Definition Multimedia Interface-Consumer Electronics Control and indicates the technology capable of simultaneously controlling a plurality of devices connected via HDMI. For example, when a TV and a settop box, which are supportive of CEC, are connected together, power of the TV and settop box can be simultaneously turned on/off and volume control and the like can be facilitated, using a single remote controller.

Namely, the display device 1500 and the settop box 1700 are connected together by HDMI-CEC communication, and the display device 1500 transmits an OSD exit signal to the settop box, thereby executing a screen switching.

If the settop box 1700 receives the first signal from the display device 1500 within the second prescribed time, the controller 1530 of the display device 1500 returns the brightness of the display 1540 to the default value.

According to the present disclosure, as a screen is changed into a live screen from a settop box menu screen, a fixed region disappears, whereby afterimage generation may be prevented.

After expiration of the second brightness decrease time, if the settop box 1700 fails to receive the first signal from the external device 1600 within the second prescribed time, the controller 1530 controls the communication unit 1520 to transmit the first signal to the settop box. This will be described with reference to FIG. 21.

Figure 21:
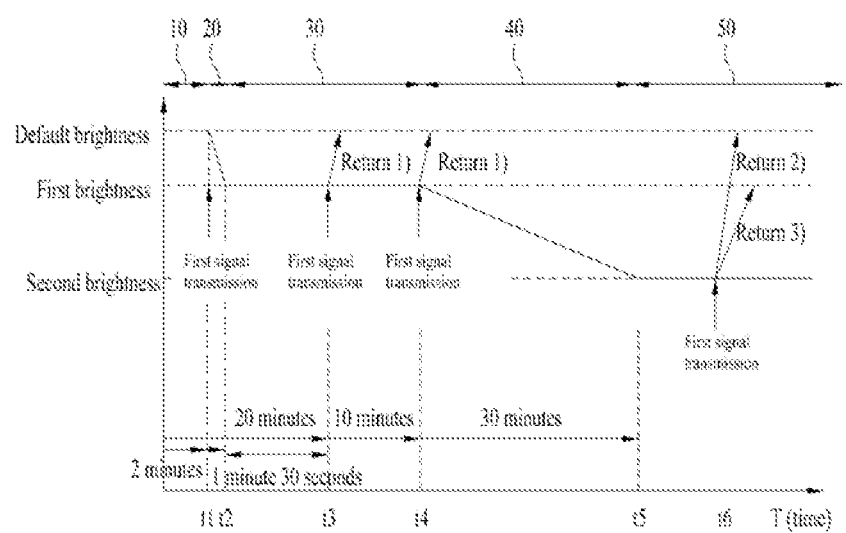
FIG. 21 is a diagram showing brightness variations depending on time when an algorithm of the present disclosure is executed, according to one embodiment of the present disclosure.

FIG. 21 is a diagram showing brightness variations depending on time when an algorithm of the present disclosure is executed, according to one embodiment of the present disclosure.

Referring to FIG. 21, an x-axis means a time and a y-axis means a brightness of the display 1540.

A first prescribed time band 10 means a time band of 0 to t1. For example, the first prescribed time band 10 may be 2 minutes.

A first brightness decrease time band 20 means a time band of t1 to t2. For example, the first brightness decrease time band 20 may be 1 minute and 30 seconds.

A second prescribed band 30 means a time band of t2 to t4. For example, the second prescribed time band 30 may be 30 minutes.

A second brightness decrease time band 40 means a time band of t4 to t5. For example, the second brightness decrease time band 40 may be 30 minute.

A third prescribed time band 50 means a time band after t5.

First of all, a brightness of the display 1540 starts from a default brightness.

In case of the first prescribed time band 10, the brightness is maintained as the default brightness.

In case of the first brightness decrease time band 20, the brightness is decreased to a first brightness from the default brightness. In case of the first brightness decrease time band 20, if the settop box 1700 receives a first signal from the external device 1600, the controller 1530 controls the display 1540 to return the brightness to the default brightness. Here, the first signal includes an OSD exit key signal. The OSD exit key signal means a signal of changing a settop box menu screen into a live screen.

In case of the second prescribed time band 30, the brightness is maintained as the first brightness.

In case of the second prescribed time band 30, if the settop box 1700 receives a first signal from the external device 1600, the controller 1530 controls the display 1540 to return the brightness from the first brightness to the default brightness. Here, the first signal includes an OSD exit key signal.

Referring to FIG. 21, for example, at t=t3, if the settop box 1700 receives a first signal from the external remote controller 1600, the controller 1530 controls the display 1540 to return the brightness from the first brightness to the default brightness.

For example, at t=t4, if the settop box 1700 receives a first signal from the external remote controller 1600, the controller 1530 controls the display 1540 to return the brightness from the first brightness to the default brightness.

Despite that a user presses a first signal send key with the external remote controller, as an external remote controller transmission direction is problematic, a first signal may not be transmitted to the external remote controller. In this case, the display device 1500 may self-transmit a first signal to the settop box 1700. Namely, as the OLED TV 1500 self-transmits the first signal to the settop box 1700, the screen may be switched from the first screen to the second screen.

In case of the second prescribed time band 30, if the settop box 1700 receives the first signal from the communication unit 1520 of the display device, the controller 1530 controls the display 1540 to return the brightness to the default brightness from the first brightness. Here, the first signal includes an OSD exit key signal. Namely, as the screen is switched from the first screen to the second screen, it is unnecessary to maintain a low brightness, the controller 1530 returns the brightness to the default brightness.

Next, decreasing the brightness from the first brightness to a second rightness is described.

On the second prescribed time band 30, since the external remote controller 1600 fails to face a correct direction, a first signal is not transmitted to the settop box 1700 using the external remote controller 1600. In addition, as a communication error occurs between the display device 1500 and the settop box 1700, if the display device 1500 does not self-transmit the first signal to the settop box 1700, the brightness is decreased to the second brightness from the first brightness, thereby preventing afterimage generation.

In case of the second brightness decrease band 40, the brightness is decreased to the second brightness from the first brightness. The first brightness is higher than the second brightness.

In case of a third prescribed 50, if the settop box 1700 receives the first signal from the communication unit 1520 of the display device, the controller 1530 controls the display 1540 to return the brightness to the default or first brightness from the second brightness.

For example, after the second brightness decrease time 40 elapsed, if the third prescribed time band 50 is entered, if the settop box 1700 receives a first signal from the external device 1600 within a third prescribed time, the display is controlled to return the brightness from the second brightness value to a value different from the second brightness value. Here, the different value means the first brightness or the default brightness.

Next, an embodiment of setting a decrease time differently will be described.

The controller 1530 sets slopes of the first and second brightness decrease time bands 20 and 40 differently.

For example, the slope of the second brightness decrease time band 40 may be set to decrease slower than that of the first brightness decrease time band 20. In this case, the second brightness decrease time decreases slowly.

The controller 1530 sets the slope of the first brightness decrease band 20 to be greater than a reference value and also sets the slope of the second brightness decrease band 40 to be smaller than the reference value.

According to the present disclosure, if a brightness is lowered abruptly, a user may recognize brightness variation of a display. Therefore, if the second decrease time band 40 is set to decrease slowly, the brightness decreases slowly, thereby preventing a user from recognizing a brightness variation of the lowered brightness.

Next, an embodiment of defining a brightness decrease time band will be described.

Referring to FIG. 21, the controller 1530 sets at least one of the first brightness decrease time band 20 and the second brightness decrease time band 40 based on the default brightness.

For example, if the default brightness is high, the controller 1530 sets at least one of the first brightness decrease time band 20 and the second brightness decrease time band 40 based on the default brightness.

Therefore, a slope of each of the first and second rightness decrease bands 20 and 40 is set smaller than a dark default brightness.

For example, if the default brightness is low, the controller 1530 sets at least one of the first brightness decrease band 20 and the second brightness decrease band 40 based on the dark default brightness.

Therefore, a slope of each of the first and second rightness decrease bands 20 and 40 is set greater than a bright default brightness.

According to the present disclosure, when a default brightness is high, even if a brightness changed slightly, a user instantly recognizes it. Hence, a brightness change is set to progress slowly. On the other hand, when a default brightness is low, if a brightness changed slightly, a user fails to recognize it well. Hence, a brightness change is set to progress a little bit rapidly.

Figure 22:
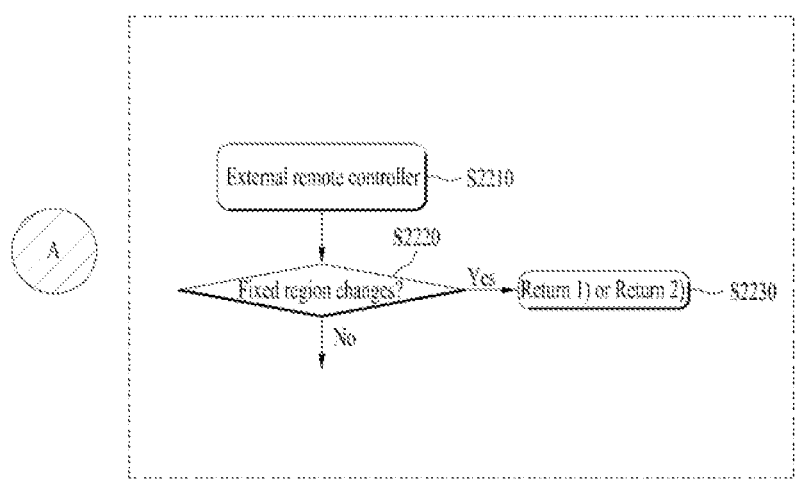
FIG. 22 is a diagram showing a first algorithm executed when a fixed region changes, according to one embodiment of the present disclosure.

FIG. 22 is a diagram showing a first algorithm executed when a fixed region changes, according to one embodiment of the present disclosure. The present disclosure is performed by the controller 1530.

Referring to FIG. 22, the settop box 1700 receives a first signal from at least one of the external device 1600 and the display device 1500 [S2210]. Here, the first signal includes an OSD exit key signal.

It is checked whether a change of a fixed region occurs in response to the first signal reception [S2220].

If the change of the fixed region occurs [S2220], a display brightness is controlled to return to a default brightness [S2230]. Return 1 or Return 2 means that a brightness is returned to a default brightness.

Figure 23:
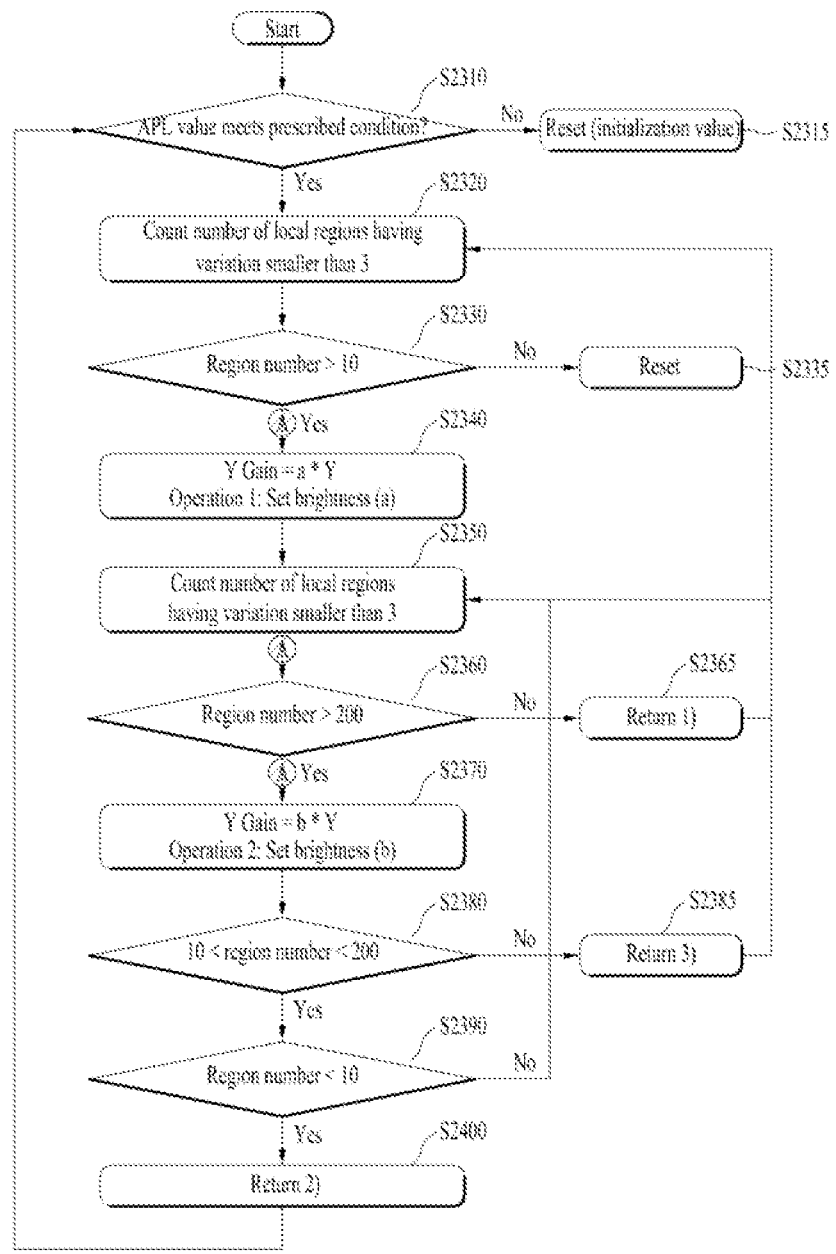
FIG. 23 is a diagram showing an execution algorithm of the present disclosure according to one embodiment of the present disclosure.

If the change of the fixed region does not occur [S2220], a next process is executed. This will be described with reference to FIG. 23 later. In FIG. 23, a first algorithm of FIG. 22 is denoted by 'A'.

If a change of a fixed region occurs, it means that, as a screen is changed from a first screen into a second screen different from the first screen, the fixed region disappears in a prescribed range of a whole display region.

An embodiment of the present disclosure is additionally described.

If the settop box 1700 receives a first signal from the external remote controller 1600, a change of a fixed region is checked. If the first signal is received correctly, the change of the fixed region occurs. In this case, a brightness is not lowered but returned to a default brightness. If the first signal is not received correctly, the change of the fixed region does not occur. In this case, an algorithm of lowering the brightness of the display 1540 is executed.

If the controller 1530 of the display device 1500 transmits a first signal to the settop box 1700, it checks a change of a fixed region. If the settop box 1700 correctly receives the first signal, it means that the change of the fixed region occurs. In this case, the brightness is not lowered but returned to the default brightness. If the first signal is not received correctly, the change of the fixed region does not occur. In this case, an algorithm of lowering the brightness of the display 1540 is executed.

FIG. 23 is a diagram showing an execution algorithm of the present disclosure according to one embodiment of the present disclosure. The present disclosure is performed by the controller 1530.

Referring to FIG. 23, it is checked whether an APL value satisfies a prescribed condition [S2310]. If the APL value fails to satisfy the prescribed condition [S2310], a brightness of the display 1540 is controlled to be initialized [S2315]. Here, if the brightness of the display 1540 is initialized, it means that the brightness is set to a default brightness.

If the PAL value satisfies the prescribed condition [S2310], the number of local regions having an APL variation smaller than 3 is counted [S2320].

The number of the local regions having the APL variation smaller than 3 is checked [S2130]. If the local region number is equal to or smaller than 10, the brightness of the display 1540 is controlled to be initialized [S2335].

If the local region number exceeds 10, the first algorithm of FIG. 22 is executed.

As a result of the first algorithm execution, if a change of a fixed region does not occur, a next process is executed. The brightness of the display 1540 is set to a first brightness [S2340].

In this case, Y Gain=a*Y.

Next, the number of local regions having an APL variation smaller than 3 is counted [S2350].

Next, the first algorithm of FIG. 22 is executed.

As a result of the first algorithm execution, if a change of the fixed region does not occur, a next process is executed.

The number of local regions having an APL variation smaller than 3 is checked [S2360].

If the region number is equal to or smaller than 200 [S2360], Return 1) is executed [S2365]. After executing Return 1), the step S2350 is entered again.

If the region number exceeds 200 [S2360], the algorithm of FIG. 22 is executed.

As a result of the first algorithm execution, if a change of the fixed region does not occur, a next process is executed. The brightness of the display 1540 is controlled to be decreased from the first brightness to a second brightness [S2370]. In this case, Y Gain=b*Y.

The local region number is checked [S2380].

If the local region number exceeds 200 [S2380], Return 3 is executed [S2385]. Return 3) means to change the brightness from the second brightness into a third brightness. After executing Return 3), the step S2350 is entered again.

If the local region number exceeds 10 and smaller than 200, the local region number is counted again.

The number of local regions having an APL variation smaller than 3 is checked [S2390].

If the local region number exceeds 10 [S2390], the step S2330 of counting the number of regions having an APL variation smaller than 3 is reentered.

If the local region number is smaller than 10, Return 2) is executed [S2400]. Return 2) means to change the brightness from the second brightness into the default brightness. After executing Return 2), the step S2330 of counting the number of regions having an APL variation smaller than 3 is reentered.

Figure 24:
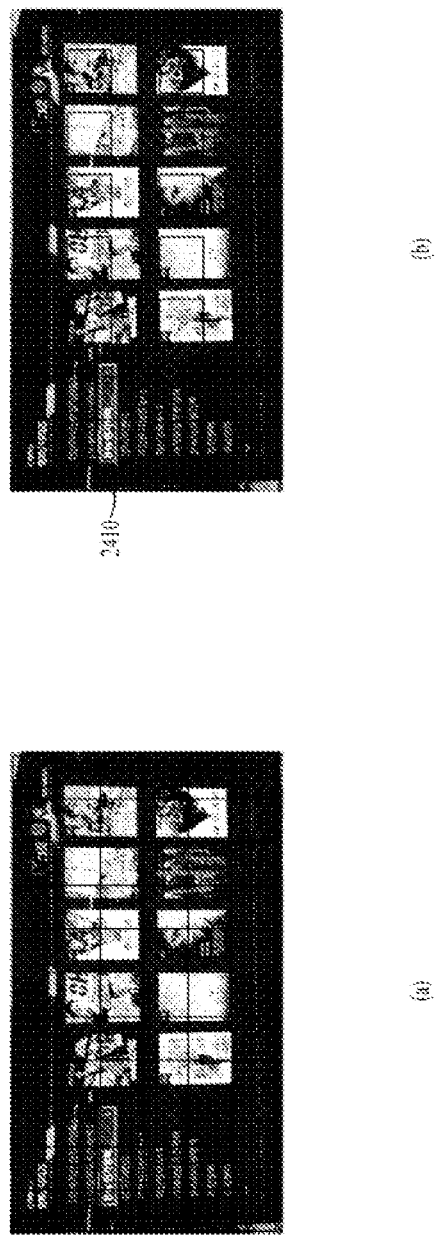
FIG. 24 is a diagram showing the concepts of a local region and a fixed region of the present disclosure, according to one embodiment of the present disclosure.

FIG. 24 is a diagram showing the concepts of a local region and a fixed region of the present disclosure, according to one embodiment of the present disclosure. FIG. 24 includes FIG. 24 (*a*) and FIG. 24 (*b*).

A fixed region means a prescribed region having possibility of degradation occurrence in a whole display region because a screen is continuously displayed thereon.

Specifically, when a whole region is divided, a local region means a single divided individual region. For example, a whole region may be divided into 500 (=25×20) local regions.

FIG. 24 (*a*) is a diagram showing that a whole region is divided into m×n local regions. Referring to FIG. 24 (*a*), a whole region may be divided into 6×11 local regions.

A first condition means that an Average Picture Level (APL) value is equal to or greater than a prescribed rate. A second condition means that a region in which an APL difference between a previous frame and a current frame of a local region is smaller than a first value is equal to or greater than a prescribed time. The APL value means a time average of an image signal for a single frame period by setting a black signal and a white signal to 0 and 100, respectively. Here, the prescribed rate may be equal to or greater than 50%.

For example, the first value may be 3 and the prescribed time may be 2 minutes.

If the number of local regions satisfying the first and second conditions is equal to or greater than a prescribed number, the controller 1500 determines the prescribed number of local regions satisfying the first and second conditions in a whole display region as a fixed region.

For example, if the number of local regions satisfying the first and second conditions is equal to greater than 10, the controller 1500 determines ten or more local regions satisfying the first and second conditions in a whole display region as a fixed region.

FIG. 24 (*b*) is a diagram showing a local region meeting a first condition and a second condition in a whole display region.

For example, if the number of local regions satisfying the first and second conditions is 12, the controller 1500 determines the 12 local regions satisfying the first and second conditions in a whole display region as a fixed region. A first local region 2410 is one embodiment, and a local region similar to the first local region 2410 is denoted by a small box in the drawing.

Referring to FIG. 24 (*b*), 12 local regions in the whole display region become a fixed region.

According to one embodiment of the present disclosure, as a fixed region of a settop box menu keeps being display, when it is highly possible that an afterimage is generated, if a settop box receives a specific signal from a remote controller, a screen is switched from a settop box menu screen to a live screen so as to prevent a problem of afterimage generation from the screen, thereby improving user convenience.

According to another embodiment of the present disclosure, as a fixed region of a settop box menu keeps being display, when it is highly possible that an afterimage is generated, a screen is switched from a settop box menu screen to a live screen by automatically transmitting a specific signal to a settop box so as to prevent a problem of afterimage generation from the screen, thereby improving user convenience.

According to further embodiment of the present disclosure, as a fixed region of a settop box menu keeps being display, when it is highly possible that an afterimage is generated, a display brightness is changed automatically so as to prevent a problem of afterimage generation from a screen, thereby improving user convenience.

The image display device and operating method thereof according to the present disclosure are not limited to the configuration and method of the embodiments described above, but the embodiments may be configured by selectively combining all or some of the embodiments so that various modifications can be made.

Meanwhile, the method of operating the image display device according to the present disclosure can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations such as transmission via Internet. Further, the recording medium readable by a processor is distributed to a computer system connected to a network, whereby codes readable by the processor by distribution can be saved and executed.

While the present disclosure has been shown and described with reference to preferred embodiments thereof without being limited by a specific embodiment, various modifications and variations can be made by those skilled in the art, to which the present disclosure pertains, provided they come within the scope of the appended claims and their equivalents. And, such modifications and variations should not be individually understood from the technical idea or perspective of the present disclosure.

Mode for Disclosure

Various embodiments have been described in BEST MODE for implementing the present disclosure.

INDUSTRIAL APPLICABILITY

The present disclosure is used in a series of display device fields.

It is obvious to those skilled in the art that various changes and modifications are possible in the present disclosure without departing from the spirit or scope of the present disclosure. Accordingly, the present disclosure is intended to include the attached claims and the changes and modifications of the present disclosure provided within the equivalent scope thereof.

What is claimed is:

1. A display device coupled to a settop box, the display device comprising:
a transceiver configured to communicate to and receive communication from an external device and the settop box;
a display configured to display a content included in a broadcast signal received from the settop box at a screen;
a sensor configured to sense a brightness of the display; and
a controller configured to control at least one of the transceiver, the display, or the sensor,
wherein the controller is further configured to:
control the display to display the content;
control the display to decrease the brightness of the display from a default brightness value to a first brightness value for a first brightness decrease time based on a brightness of a fixed region of a whole display region being maintained at a brightness level that exceeds a prescribed brightness over a first prescribed time, wherein a fixed content received from the settop box is continuously displayed at the fixed region over the first prescribed time;
control the display to increase the brightness of the display from the first brightness value to the default brightness value based on a first signal being received at the settop box from the external device within a second prescribed time, the first signal requesting changing the screen from a first screen comprising a settop box menu screen to a second screen comprising a live screen; and
control the display to decrease the brightness of the display from the first brightness value to a second brightness value for a second brightness decrease time based on the sensed brightness of the fixed region being maintained over the second prescribed time while the first signal is not received at the settop box from the external device.

2. The display device of claim 1, wherein after the second brightness decrease time elapses, the controller is further configured to control the display to return the brightness of the display from the second brightness value to a value different from the second brightness value based on the first signal being received at the settop box from the external device within the second prescribed time.

3. The display device of claim 1, wherein the controller is further configured to set a slope of the first brightness decrease time to be different from a slope of the second brightness decrease time.

4. The display device of claim 3, wherein the controller is further configured to:
set the slope of the first brightness decrease time to be greater than a reference value; and
set the slope of the second brightness decrease time to be smaller than the reference value.

5. The display device of claim 1, wherein based on the first signal not being received at the settop box from the external device within the second prescribed time, the controller is further configured to control the transceiver to transmit the first signal to the settop box.

6. The display device of claim 5, wherein the controller is further configured to control the transceiver to transmit the first signal to the settop box via High Definition Multimedia Interface-Consumer Electronics Control (HDMI-CEC) communication.

7. The display device of claim 5, wherein after the second brightness decrease time elapses, the controller is further configured to control the transceiver to transmit the first signal to the settop box based on the first signal not being received at the settop box from the external device within the second prescribed time.

8. The display device of claim 1, wherein based on a number of local regions satisfying a first condition and a second condition being equal to or greater than a prescribed number, the controller is further configured to determine at least the prescribed number of local regions of the whole display region as the fixed region, wherein the first condition is satisfied if an Average Picture Level (APL) of the local region is equal to or greater than a prescribed rate, and wherein the second condition is satisfied if an interval, in which an APL difference between a previous frame and a current frame of the local region is smaller than a first value, is equal to or greater than a prescribed time.

9. The display device of claim 1, wherein the controller is further configured to set one of the first brightness decrease time or the second brightness decrease time to a value corresponding to the default brightness.

10. A method of controlling a display device coupled to a settop box and including a transceiver configured to communicate to and receive communication from an external device and the settop box, the method comprising:
   displaying, by a display of the display device, a content included in a broadcast signal received from the settop box at a screen;
   controlling the display to decrease a brightness of the display from a default brightness value to a first brightness value for a first brightness decrease time based on a brightness of a fixed region of a whole display region being maintained at a brightness level that exceeds a prescribed brightness over a first prescribed time, wherein a fixed content received from the settop box is continuously displayed at the fixed region over the first prescribed time;
   controlling the display to increase the brightness of the display from the first brightness value to the default brightness value based on a first signal being received at the settop box from the external device within a second prescribed time, the first signal requesting changing of the screen from a first screen comprising a settop box menu screen to a second screen comprising a live screen from the external device; and
   controlling the display to decrease the brightness of the display from the first brightness value to a second brightness value for a second brightness decrease time based on the brightness of the fixed region being maintained over the second prescribed time while the first signal is not received at the settop box from the external device.

11. The method of claim 10, further comprising, after the second brightness decrease time elapses, controlling the display to return the brightness of the display from the second brightness value to a value different from the second brightness value based on the first signal being received at the settop box from the external device within the second prescribed time.

12. The method of claim 10, further comprising setting a slope of the first brightness decrease time to be different from a slope of the second brightness decrease time.

13. The method of claim 12, further comprising:
   setting the slope of the first brightness decrease time to be greater than a reference value; and
   setting the slope of the second brightness decrease time to be smaller than the reference value.

14. The method of claim 10, further comprising, based on the first signal not being received at the settop box from the external device within the second prescribed time, controlling the transceiver of the display device to transmit the first signal to the settop box.

15. The method of claim 14, wherein controlling the transceiver to transmit the first signal to the settop box comprises controlling the transceiver to transmit the first signal to the settop box via High Definition Multimedia Interface-Consumer Electronics Control (HDMI-CEC) communication.

16. The method of claim 14, further comprising, after the second brightness decrease time elapses, controlling the transceiver to transmit the first signal to the settop box based on the first signal not being received at the settop box from the external device within the second prescribed time.

17. The method of claim 10, further comprising, based on a number of local regions of the whole display region satisfying a first condition and a second condition being equal to or greater than a prescribed number, determining at least the prescribed number of local regions of the whole display region as the fixed region,
   wherein the first condition is satisfied if an Average Picture Level (APL) of the local region is equal to or greater than a prescribed rate, and
   wherein the second condition is satisfied if a time interval, in which an APL difference between a previous frame and a current frame of the local region is smaller than a first value, is equal to or greater than a prescribed time.

18. The method of claim 10, further comprising setting one of the first brightness decrease time or the second brightness decrease time to a value corresponding to the default brightness.

19. A display device coupled to a settop box, the display device comprising:
   a transceiver configured to communicate to and receive communication from an external device and the settop box;
   a display configured to display a content included in a broadcast signal received from the settop box at a screen;
   a sensor configured to sense a brightness of the display; and
   a controller configured to control at least one of the transceiver, the display, or the sensor,
   wherein the controller is further configured to:
   control the display to display the content;
   control the display to decrease the brightness of the display from a default brightness value to a first brightness value for a first brightness decrease time based on a brightness of a fixed region of a whole display region being maintained at a brightness level that exceeds a prescribed brightness over a first prescribed time, wherein a fixed content received from the settop box is continuously displayed at the fixed region over the first prescribed time;
   control the display to increase the brightness of the display from the first brightness value to the default brightness value based on a first signal being received at the settop box from the external device within a second prescribed time, the first signal requesting changing the screen from a first screen to a second screen; and
   control the display to decrease the brightness of the display from the first brightness value to a second brightness value for a second brightness decrease time based on the sensed brightness of the fixed region being maintained over the second prescribed time while the first signal is not received at the settop box from the external device,
   wherein based on a number of local regions satisfying a first condition and a second condition being equal to or greater than a prescribed number, the controller is further configured to determine at least the prescribed number of local regions of the whole display region as the fixed region, wherein the first condition is satisfied if an Average Picture Level (APL) of the local region is equal to or greater than a prescribed rate, and wherein the second condition is satisfied if an interval, in which an APL difference between a previous frame and a current frame of the local region is smaller than a first value, is equal to or greater than a prescribed time.

\* \* \* \* \*